(12) United States Patent
Knoplioch et al.

(10) Patent No.: US 6,711,231 B2
(45) Date of Patent: Mar. 23, 2004

(54) METHODS AND APPARATUS TO ASSIST AND FACILITATE VESSEL ANALYSIS

(75) Inventors: Jerome Knoplioch, Neuilly sur Seine (FR); Gilles R. Moris, Boulogne-Billancourt (FR); James Donald Markvicka, New Berlin, WI (US); Robert James Young, Wauwatosa, WI (US); Beth Ann Heckel, Sturtevant, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 13 days.

(21) Appl. No.: 10/012,954

(22) Filed: Dec. 10, 2001

(65) Prior Publication Data

US 2003/0108145 A1 Jun. 12, 2003

(51) Int. Cl.[7] .................................................. A61B 6/03
(52) U.S. Cl. ................................ 378/8; 378/15; 378/99
(58) Field of Search ........................... 378/4, 8, 15, 19, 378/90

(56) References Cited

U.S. PATENT DOCUMENTS

| | | |
|---|---|---|
| 5,611,025 A | * 3/1997 | Lorensen et al. ........... 345/419 |
| 5,630,034 A | 5/1997 | Oikawa et al. |
| 5,782,762 A | 7/1998 | Vining |
| 5,791,908 A | 8/1998 | Gillio |
| 5,891,030 A | 4/1999 | Johnson et al. |
| 5,971,767 A | 10/1999 | Kaufman et al. |
| 6,023,639 A | 2/2000 | Hakky et al. |
| 6,166,740 A | 12/2000 | Malzbender |
| 2001/0031920 A1 | 10/2001 | Kaufman et al. |

FOREIGN PATENT DOCUMENTS

| | | |
|---|---|---|
| WO | WO 98/37517 | 8/1998 |
| WO | WO 00/41134 | 7/2000 |

OTHER PUBLICATIONS

European Search Report; Intl. Appl. No. 02258506.1–1526 (5 pgs.).

* cited by examiner

Primary Examiner—David V. Bruce
(74) Attorney, Agent, or Firm—Carl B. Horton, Esq.; Armstrong Teasdale LLP

(57) ABSTRACT

A method for analyzing a tubular structure in a patient includes receiving a cursor first position within a displayed tubular structure representative of the tubular structure in the patient, determining a path inside the tubular structure based only on the received cursor first position, and moving a cursor along the path by a pre-determined distance in a pre-determined direction to a cursor second position.

31 Claims, 21 Drawing Sheets

Figure 5

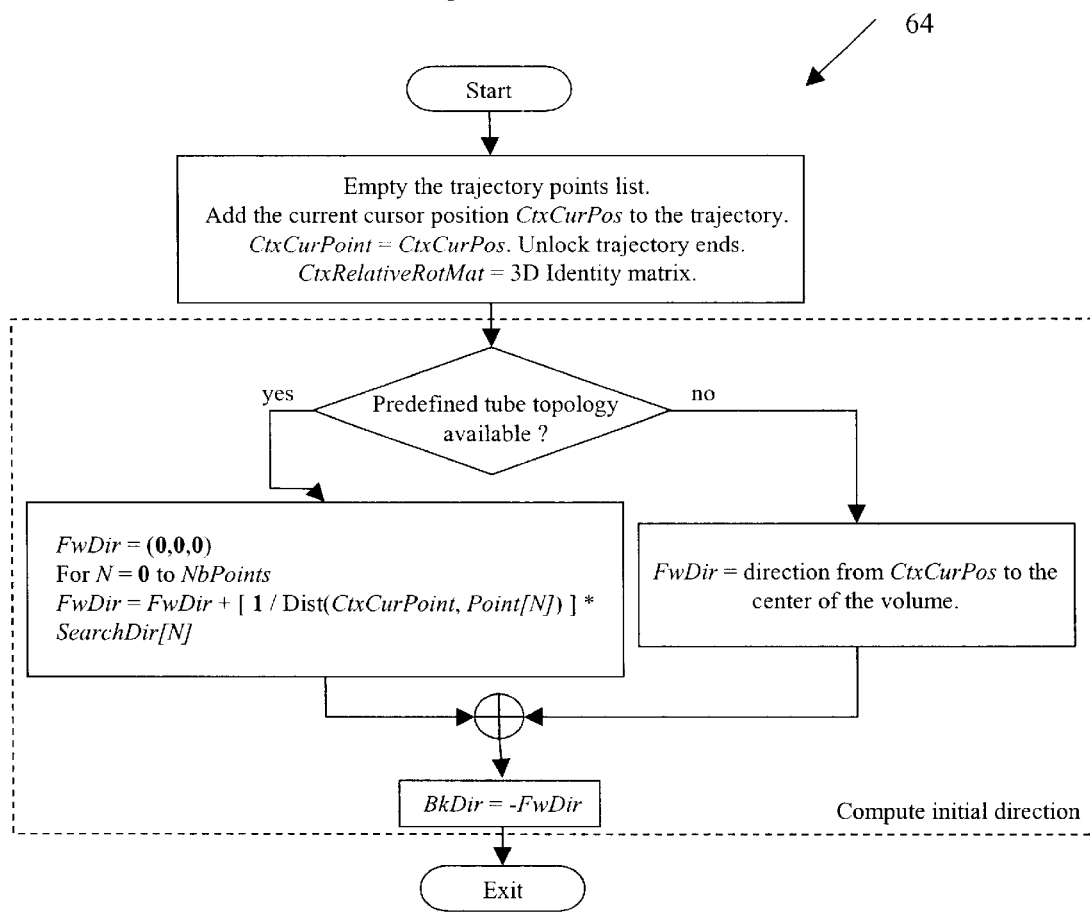

where
- *FwDir* = *CtxDirToGo(CtxCurPoint,Forward)* = search direction in the forward way at the current trajectory point,
- *BkDir* = *CtxDirToGo(CtxCurPoint,Backward)* = search direction in the backward way at the current trajectory point,
- *NbPoints* = number of points defining the predefined tube topology,
- *Point[N]* = the Nth point of the predefined topology (3D Vector), and
- *SearchDir[N]* = the predefined search direction at the Nth point position. (3D vector).

Given data are *CtxCurPoint* (3D point) and *DirToGo* (3D vector).
The radius of the sphere *CtxSphereRadius* is fixed.
If *DirToGo* is normalized, then we have
*CenterOfSphere* = *CtxCurPoint* + (4.*CtxSphereRadius*/5).*DirToGo*.

where distances to *CtxCurPoint* (*D()*) and distances to the border of the tube are taken from distance maps.

Figure 17
- Detect immediate half-turns,
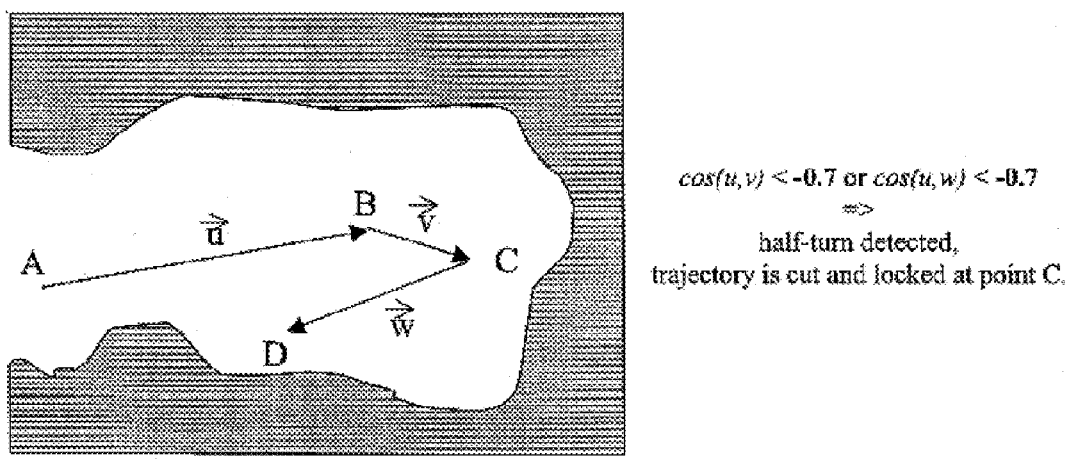
$cos(u,v) < -0.7$ or $cos(u,w) < -0.7$
$\Rightarrow$
half-turn detected,
trajectory is cut and locked at point C.
- Detect loops.
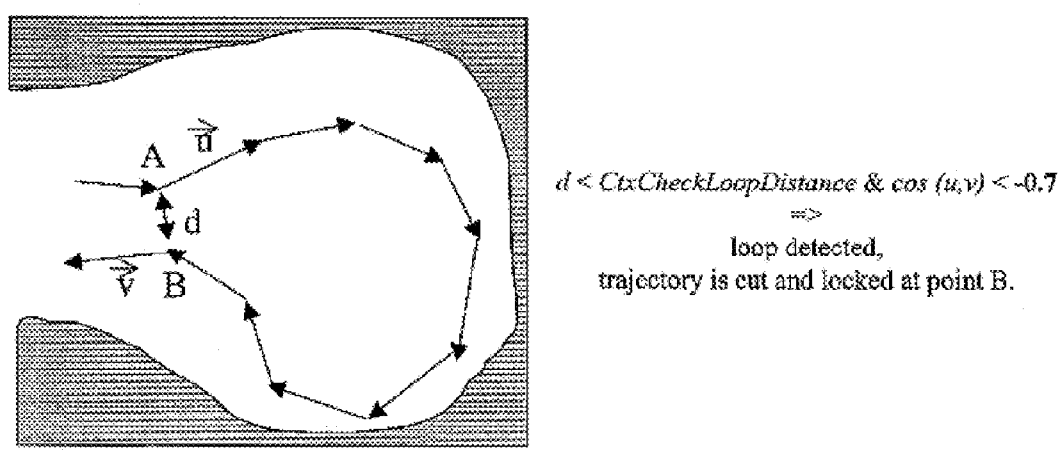
$d < CtxCheckLoopDistance$ & $cos(u,v) < -0.7$
$\Rightarrow$
loop detected,
trajectory is cut and locked at point B.

Figure 19

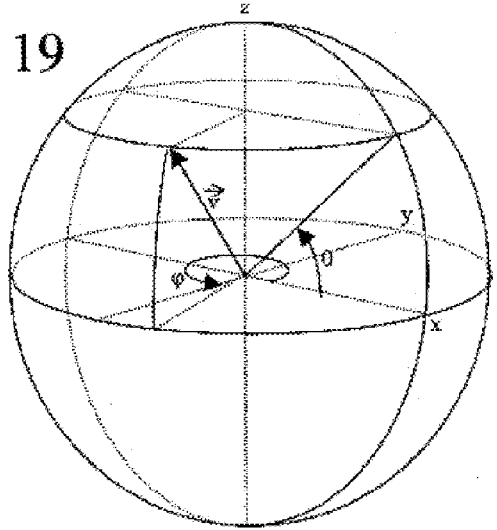

Sampling the Unit sphere

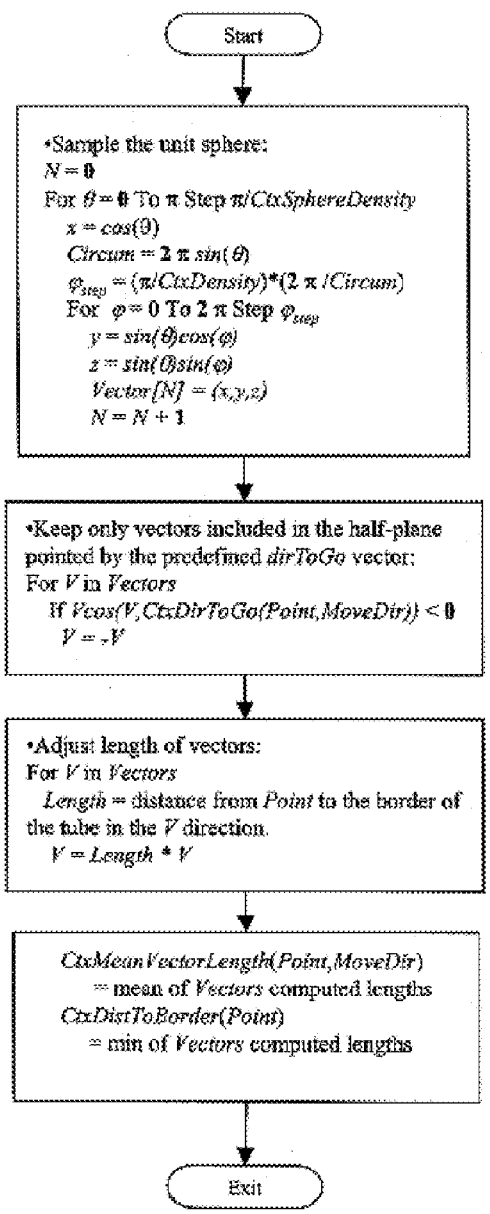

```
Start

•Sample the unit sphere:
N = 0
For θ = 0 To π Step π/CtxSphereDensity
    x = cos(θ)
    Circum = 2 π sin(θ)
    φ_step = (π/CtxDensity)*(2 π /Circum)
    For φ = 0 To 2 π Step φ_step
        y = sin(θ)cos(φ)
        z = sin(θ)sin(φ)
        Vector[N] = (x,y,z)
        N = N + 1

•Keep only vectors included in the half-plane
pointed by the predefined dirToGo vector:
For V in Vectors
    If Vcos(V, CtxDirToGo(Point,MoveDir)) < 0
        V = -V

•Adjust length of vectors:
For V in Vectors
    Length = distance from Point to the border of
    the tube in the V direction.
    V = Length * V CtxMeanVectorLength(Point,MoveDir)
    = mean of Vectors computed lengths
CtxDistToBorder(Point)
    = min of Vectors computed lengths Exit
```

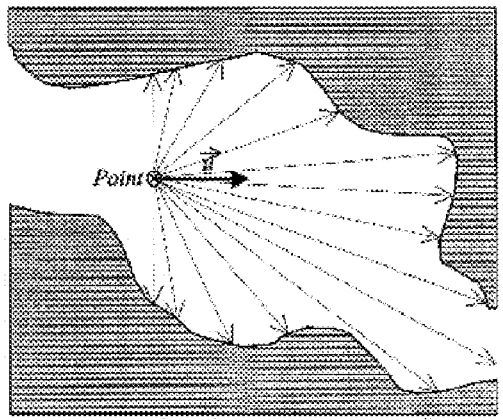

$\vec{u}$ = initial direction to go in MoveDir direction
  = CtxDirToGo(Point,MoveDir) before computation Figure 20
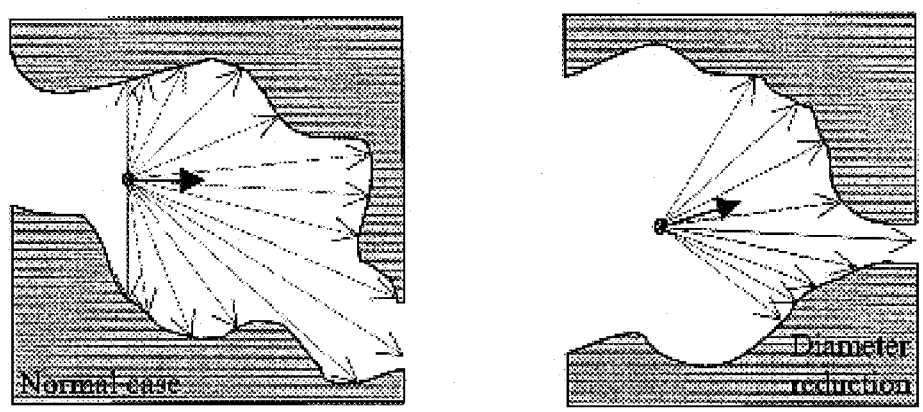
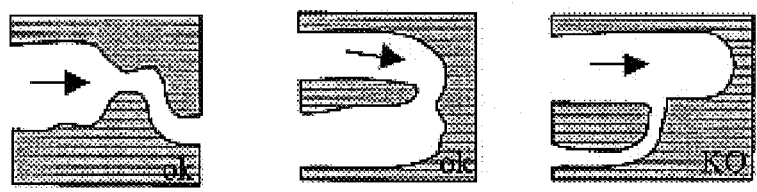

METHODS AND APPARATUS TO ASSIST AND FACILITATE VESSEL ANALYSIS

BACKGROUND OF THE INVENTION

This invention relates generally to methods and apparatus for analysis of vessel images, and more particularly to methods and apparatus for assisting medical care personnel such as radiologists in preparing measurements and reports during radiological examinations from images derived from computed tomographic, MR, and 3D radiation imaging.

In at least some computed tomography (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodetectors adjacent the scintillator.

One application of computed tomographic (CT) imaging, as well as magnetic resonance (MR) imaging and 3-D x-ray imaging (3DXR), is vascular analysis. X-ray quantification and analysis of vessel pathologies are important for radiologists who are called upon to assess stenosis or aneurysm parameters, quantify lengths, section sizes, angles, and related parameters. In some known imaging systems, analysis of vessel pathologies using three-dimensional data, such as CT, MR or 3DXR.

Analysis of visual pathologies may sometimes be difficult since the operator has to track possibly tortuous structures. These imaging systems may include a method whereby a path is located between a starting point and an ending point, then the operator navigates along the calculated path with the aid of simple interface devices, such as sliders or scrollbars which may increase the computer time required to define and calculate the paths. Further, in the case of occlusions or discontinuous paths additional steps may be required to view the structure.

BRIEF DESCRIPTION OF THE INVENTION

In one embodiment, a method for analyzing a tubular structure in a patient is provided. The method includes receiving a cursor first position within a displayed tubular structure representative of the tubular structure in the patient, determining a path inside the tubular structure based only on the received cursor first position, and moving a cursor along the path by a pre-determined distance in a pre-determined direction to a cursor second position.

In another embodiment, a method for reviewing a tubular structure over a passage of time is provided. The method includes providing at least a first three-dimensional data set at a first time and a second three-dimensional data set at a second time representative of the same tubular structure, generating a first view of the first three-dimensional data set and a second view of the second three-dimensional data set, and positioning a first cursor at a first three-dimensional location within the first view and positioning a second cursor at a first three-dimensional location within the second view corresponding to the first cursor location in the first view. The method also includes determining a path inside the tubular structure, defining a direction from the cursor position in at least one of the first view and the second view, and moving the first cursor along the determined path by a pre-determined distance in a pre-determined direction to first cursor second position and moving the second cursor along the determined path by a pre-determined distance in a pre-determined direction to second cursor second position.

In a further embodiment, a computer readable medium encoded with a program executable by a computer for analyzing a tubular structure in a patient is provided. The program is configured to instruct the computer to receive a cursor first position within a displayed tubular structure representative of a tubular structure in a patient, determine a path inside the tubular structure based on the received cursor first position, wherein the determined path includes a determined endpoint, and move a cursor along the path by a pre-determined distance in a pre-determined direction to a cursor second position.

In yet another embodiment, a medical imaging system for analyzing a tubular structure in a patient is provided. The medical imaging system includes a detector array, at least one radiation source, and a computer coupled to the detector array and radiation source. The computer is configured to receive a cursor first position within a displayed tubular structure representative of the tubular structure in the patient, determine a path including an endpoint inside the tubular structure based on the received cursor first position, and move a cursor along the path by a pre-determined distance in a pre-determined direction to a cursor second position.

BRIEF DESCRIPTION OF THE DRAWINGS

FIG. 5 is a portion of the method illustrated in FIG. 3 for analyzing a tubular structure.

FIG. 17 is a portion of the method illustrated in FIG. 3 for analyzing a tubular structure.

FIG. 19 is a portion of the method illustrated in FIG. 3 for analyzing a tubular structure.

FIG. 20 is a portion of the method illustrated in FIG. 3 for analyzing a tubular structure.

DETAILED DESCRIPTION OF THE INVENTION

Figure 1:
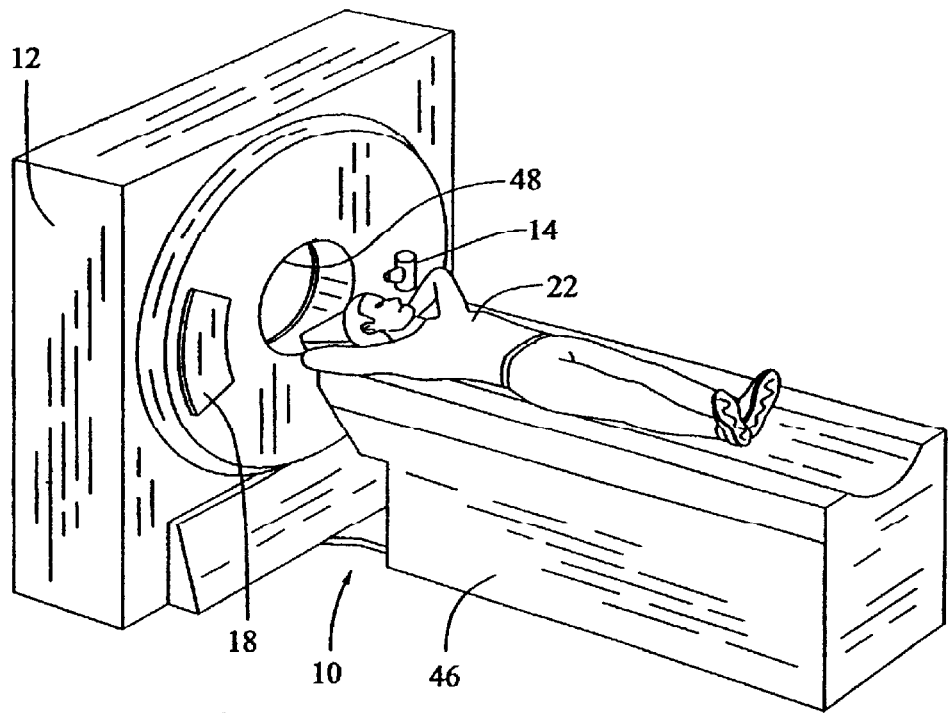
FIG. 1 is a pictorial view of a CT imaging system.
Figure 2:
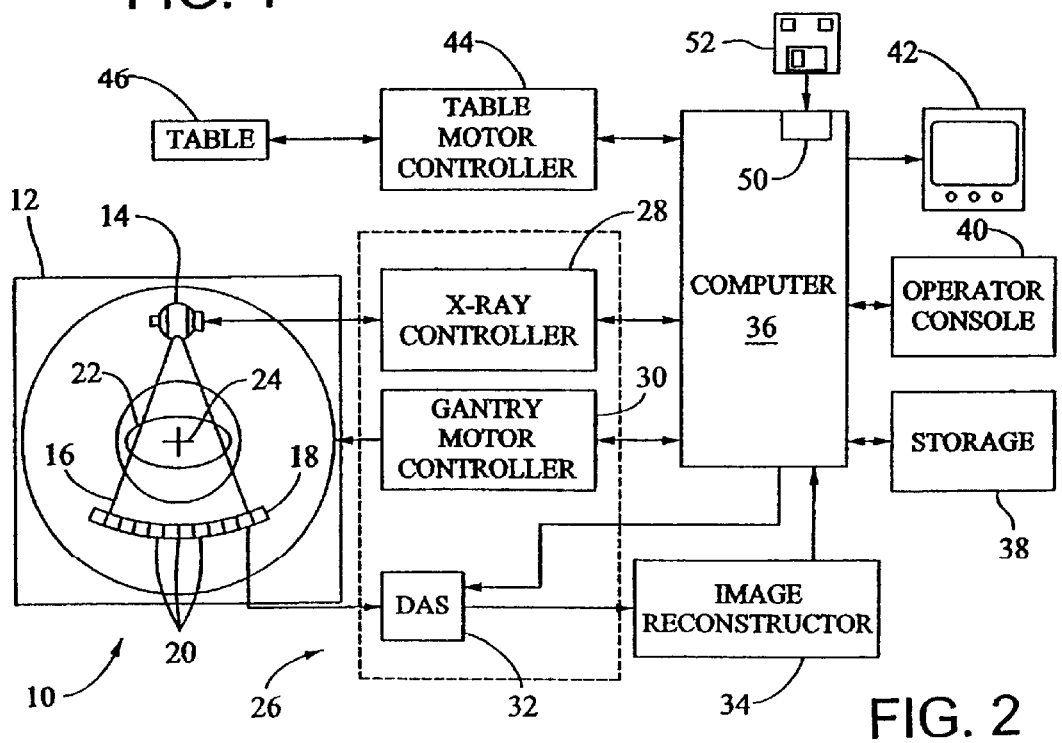
FIG. 2 is a block schematic diagram of the system illustrated in FIG. 1.

In one embodiment of the present invention, computed tomographic images are used. Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object, such as a medical patient 22. Each detector element 20 produces an electrical signal that represents the intensity of an impinging x-ray beam and hence the attenuation of the beam as it passes through object or patient 22. During a scan to acquire x-ray projection data, gantry 12 and the components mounted thereon rotate about a center of rotation 24. In one embodiment, and as shown in FIG. 2, detector elements 20 are arranged in one row so that projection data corresponding to a single image slice is acquired during a scan. In another embodiment, detector elements 20 are arranged in a plurality of parallel rows, so that projection data corresponding to a plurality of parallel slices can be acquired simultaneously during a scan.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high-speed image reconstruction. The reconstructed image is applied as an input to a computer 36 which stores the image in a mass storage device 38.

Computer 36 also receives commands and scanning parameters from an operator via console 40 that has a keyboard. An associated display 42, such as a liquid crystal display (LCD) and a cathode ray tube, allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48. Computer 36, console 40, and display 42 are used in the following method, in conjunction with a pointing device and a keyboard. The pointing device is, for example, a control on console 40 or a separate device such as a mouse (not shown).

In one embodiment, computer 36 includes a device 50 for reading and writing onto removable media 52. For example, device 50 is a floppy disk drive, a CD-R/W drive, or a DVD drive. Correspondingly, media 52 is a floppy disk, a compact disk, or a DVD. Device 50 and media 52 are used in one embodiment to transfer acquired projection data from imaging system 10 to another computer for further processing, or in another embodiment to input machine readable instructions that are processed by computer 36.

Figure 3:
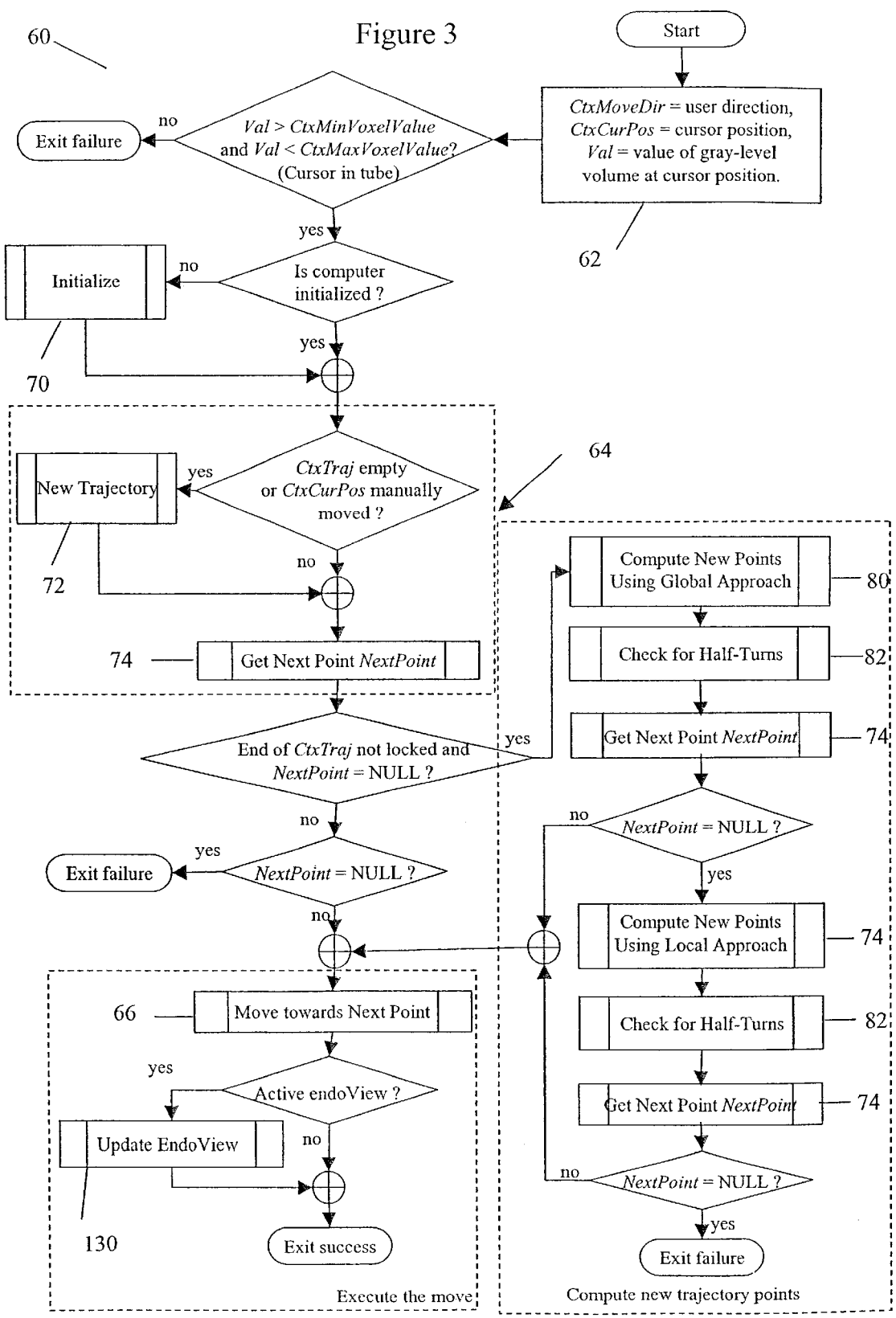
FIG. 3 is a flowchart of an exemplary embodiment of a method for analyzing a tubular structure in a patient.

FIG. 3 is a flowchart of an exemplary embodiment of a method 60 for analyzing a tubular structure in a patient 22 (shown in FIG. 1). Method 60 describes a method to guide at least one cursor along a centerline of a tubular structure, such as a colon, in at least one examination. The cursor is a visual marker which indicates a three-dimensional location, and may be deposited by a user at a selected location within the tubular structure, such as three-dimensional views and reformatted slices. Method 60 facilitates computing a local path around the cursor position wherein the path is the centerline of the tubular structure. The location of the cursor is displayed in three-dimensional views. Axial, Sagittal, Coronal and Oblique slices that contain the cursor can then be displayed. Further, if the view is rotated, the angle from the tangent to a centerline of the structure at the current cursor position is stored so that further internal three-dimensional views are displayed at the same angle from the new tangents, thereby maintaining the same orientation relative to the structure.

Method 60 includes receiving 62 a cursor first position within a displayed tubular structure representative of a tubular structure in the patient, determining 64 a path inside the tubular structure, and moving 66 a cursor along the path by a pre-determined distance in a pre-determined direction to a cursor second position. Method 60 also includes displaying at least one of a three-dimensional view depicting the cursor second position, an axial, a sagittal, a coronal, and at least one oblique slice depicting the cursor second position, wherein the oblique slice is perpendicular to the tubular structure at the cursor second position. Method 60 also includes displaying an internal three-dimensional view from the cursor second position, wherein the internal view is an "endoscopic like" view.

Receiving 62 a cursor first position includes inputting a first cursor position, determining if the first cursor position is within the tubular structure, and initializing a computer program installed on computer 36.

In use, an operator inputs into computer 36 a cursor first position inside the tubular structure and a direction along the tubular structure in which the operator wishes to examine. In one embodiment, the cursor first position is input by the operator using the pointing device and the direction is input by the operator by depressing at least one key on the keyboard, such as, but not limited to, the forward arrow key and the backward arrow key. In another embodiment, the cursor first position and the direction are input by the operator using other conventional data input methods. Computer 36 receives the operator input and generates a three-dimensional vector including a current cursor position value (CtxCurPos), and a vector direction component (CtxMoveDir). The cursor first position is assigned as the CtxCurPos, i.e. a current cursor position that is within a three-dimensional tubular structure as depicted on display 42, for example, a colon (not shown). The computer assigns the user selected direction input as the CtxMoveDir, i.e., computer 36 generates a three-dimensional vector with an origin at the CtxCurPos in the direction of the CtxMoveDir. Additionally, computer 36 assigns a gray-level value (Val) to the CtxCurPos. Computer 36 generates the vector based only on the received cursor position, i.e., computer 36 does not compute the vector (i.e., the path) using both a received starting point and a received ending point. Rather computer 36 determines an ending point according to the vector.

Computer 36 then determines whether the cursor is in the tubular structure. If the gray-level value assigned to the CtxCurPos is between a minimum voxel value (CtxMinVoxelValue) defining the tubular structure and a maximum voxel value (CtxMaxVoxelValue) defining the tubular structure, i.e. CtxMinVoxelValue>CtxCurPos<CtxMaxVoxelValue, computer 36 then proceeds to initialize the program installed on computer 36. Alternatively, when the CtxCurPos is not between CtxMinVoxelValue and CtxMaxVoxelValue, computer 36 generates a false output and requests the operator to re-input the CtxCurPos and the CtxMoveDir. Computer 36 then determines whether a program installed on computer 36 has been initialized. If the program has been initialized, computer 36 continues method 60, if the program has not been initialized, computer 36 initializes the program and continues method 60.

Figure 4:
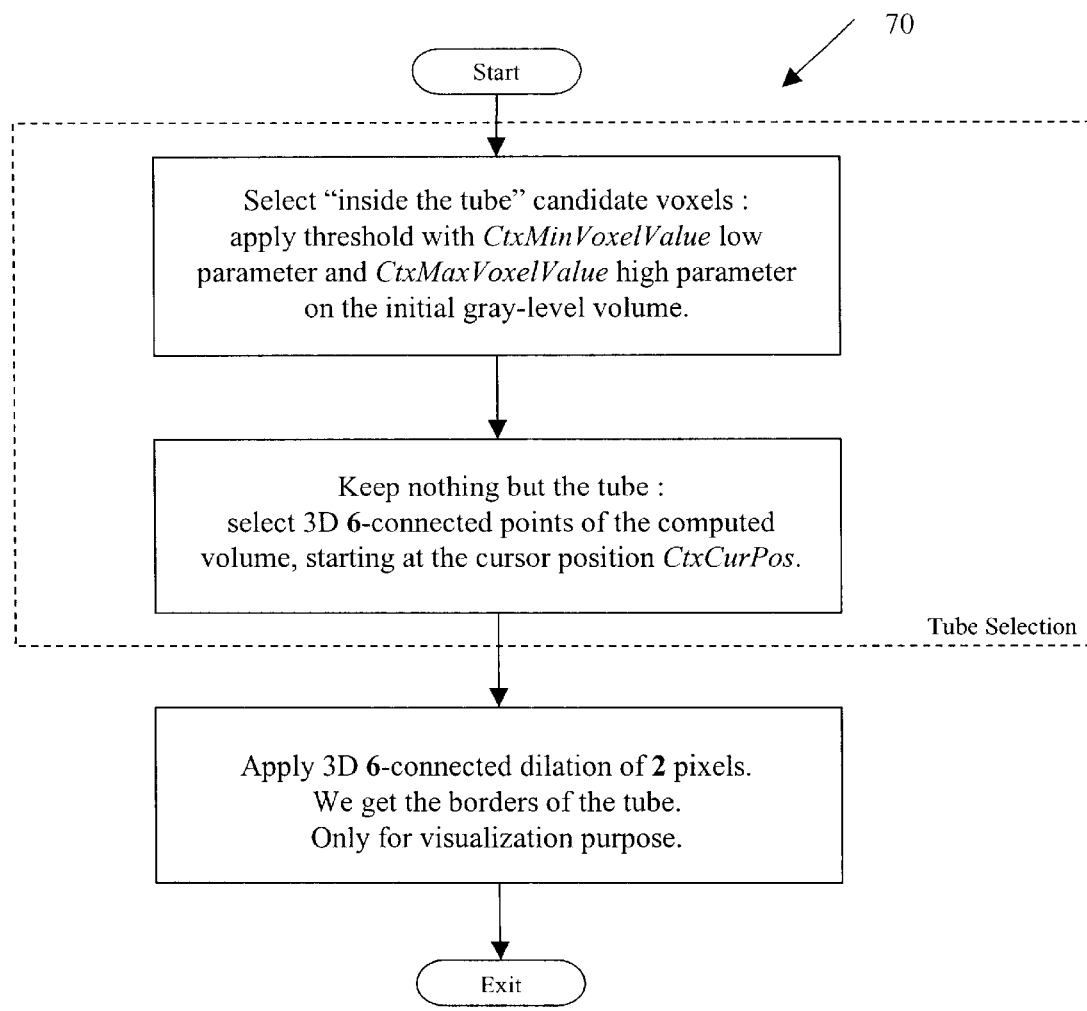
FIG. 4 is a portion of the method illustrated in FIG. 3 for analyzing a tubular structure.

FIG. 4 is a flowchart illustrating a portion of method 60 including initializing 70 computer 36. Initializing 70 computer 36 includes selecting a plurality of candidate voxels inside the tubular structure and connecting a plurality of the candidate voxels.

In use, selecting a plurality of candidate voxels inside the tubular structure includes applying a threshold value to the candidate voxels in the initial gray-level volume, i.e. defining the tubular structure and keeping nothing but the tubular structure and eliminating all points not located in the tubular structure. Initializing 70 is effective if voxels not selected are not used in any of the calculation processes described hereinafter. Alternatively, initialization 70 is implementation dependant and may be bypassed by the operator. In one embodiment, the operator may view a border of the tubular structure by applying a three-dimensional dilation of two pixels.

FIG. 5 is a flowchart illustrating a portion of method 60 including determining 64 a path inside the tubular structure which includes determining 72 a new trajectory and getting 74 a NextPoint point in the trajectory. Determining 72 a trajectory includes initializing a context, starting a new trajectory using the current CtxCurPos, and setting an initial search direction.

Computer 36 first determines whether a trajectory context (CtxTraj) is empty or the CtxCurPos has been manually moved. The CtxTraj is a doubled chained list of points with directional information. If the CtxTraj is not empty and the CtxCurPos has not been manually moved, computer 36 continues method 60 and proceeds to getting 74 a next point (NextPoint). If the CtxTraj is empty or the CtxCurPos has been manually moved, computer 36 determines a new path inside the tubular structure.

In use, computer 36 empties a trajectory points list and adds the current CtxCurPos to the trajectory, i.e. sets CtxCurPoint=CtxCurPos. Computer 36 unlocks the trajectory ends to enable computer 36 to add additional points. Locking a trajectory end prohibits computer 36 from inputting additional trajectory points. Computer 36 then sets a rotation matrix (CtxRelativeRotMat)= a three-dimensional identity matrix. The CtxRelativeRotMat is used by computer 36 to obtain the initial search direction using the CtxCurPos in the direction of the CtxMoveDir as described herein. In one embodiment, x and y rotations, i.e. the two-dimensional screen coordinates, are used to generate a three-dimensional rotation matrix. Computer 36 then determines whether a predefined tubular structure topology is available. Computer 36 determines an initial search direction, i.e. forward (FwDir) or backward (BkDir) according to FIG. 5.

Figure 6:
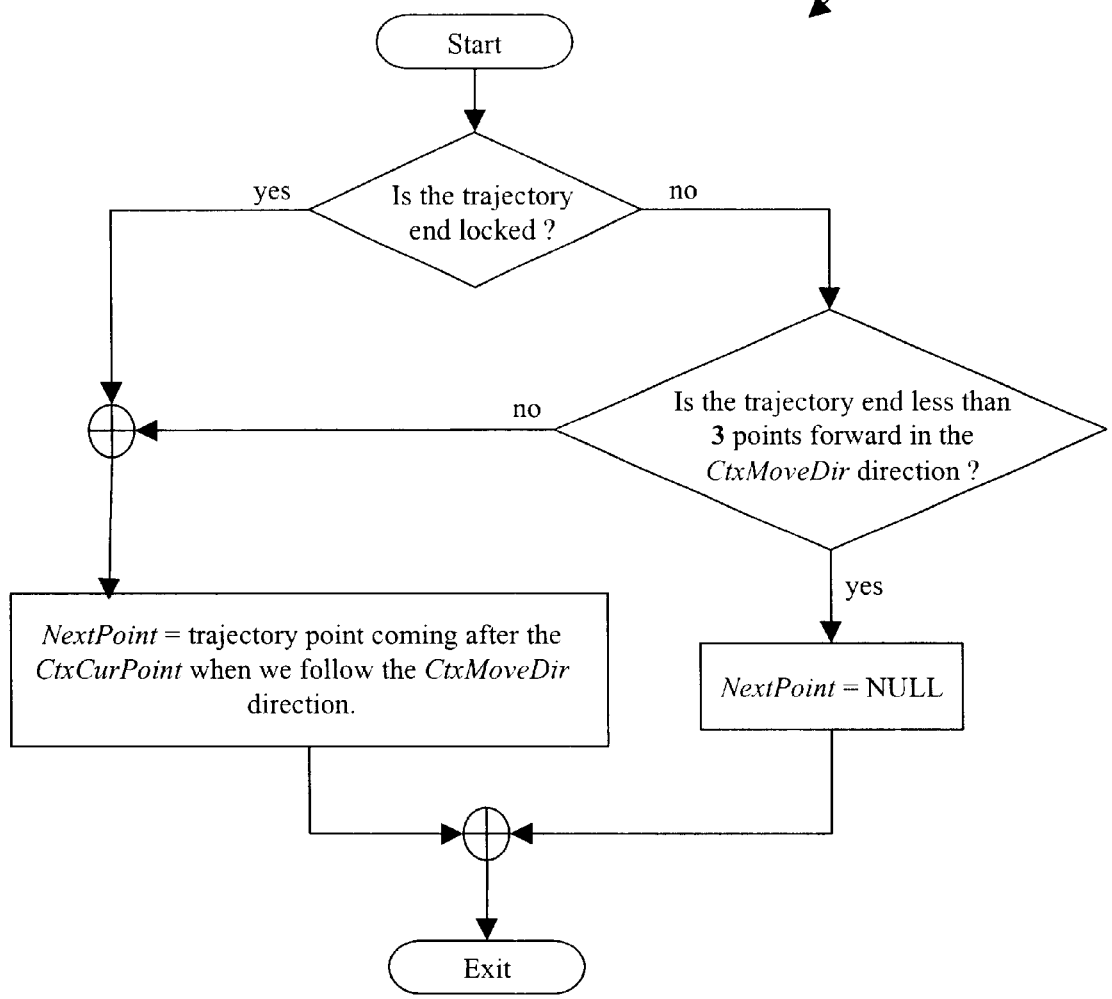
FIG. 6 is a portion of the method illustrated in FIG. 3 for analyzing a tubular structure.

FIG. 6 is a flowchart illustrating a portion of method 60 including getting 74 a NextPoint point. Getting 74 a NextPoint point includes determining if the trajectory end is locked. In one embodiment, if the trajectory end is locked, computer 36 determines if the trajectory end is less than three points forward in the CtxMoveDir, and if the trajectory end is less than three points forward in the move direction, computer 36 sets a next point (NextPoint) equal to null and continues. If the trajectory end is locked and the trajectory point is not less than three points forward in the CtxMoveDir, computer 36 sets NextPoint equal to a trajectory point subsequent to the CtxCurPoint in the CtxMoveDir and continues the program. Alternatively, if the trajectory end is not locked, computer 36 sets NextPoint equal to a trajectory point subsequent to the CtxCurPoint in the CtxMoveDir. Recomputing the trajectory when the aimed trajectory is less than three points from the trajectory end facilitates ensuring that the trajectory remains close to the center of the tubular structure.

Referring again to FIG. 3, computer 36 then verifies that the CtxTraj is not locked and NextPoint equals null. If yes, i.e. the CtxTraj is not locked and NextPoint equals null, computer 36 computes new points using a global approach as explained in greater detail below. Alternatively, computer 36 queries NextPoint to verify if NextPoint equals null. If no, i.e., next point does not equal null, computer 36 proceeds with method 60. If yes, NextPoint is null, forward progression stops and the operator can move backwards or restart from another point. Alternatively, the trajectory is recomputed if it remains less than 3 points until the end. Recomputing the trajectory facilitates ensuring that the trajectory remains close to the center of the tubular structure. Additionally, through locking the trajectory (CtxTraj) and/or checking NextPoint for being null, computer 36 is able to determine when to stop progression either forward or backward.

Figure 7:
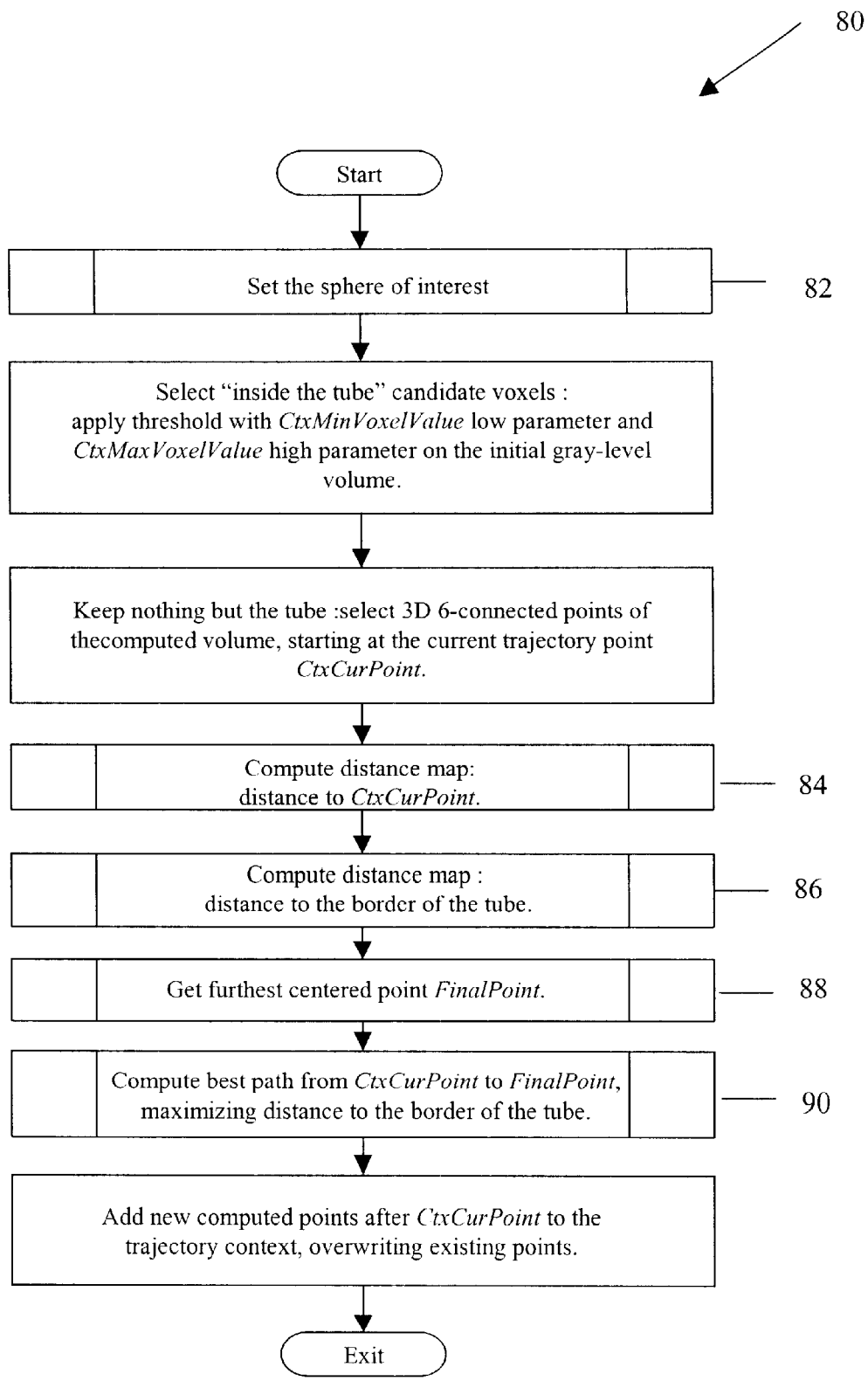
FIG. 7 is a portion of the method illustrated in FIG. 3 for analyzing a tubular structure.

FIG. 7 is a flowchart illustrating a portion of method 60 including computing 80 new points using a global approach. Computing 80 new points using a global approach includes setting 82 a sphere of interest, computing 84 a distance to CtxCurPoint, computing 86 a distance to a tubular structure border, getting 88 a furthest centered point (FinalPoint), and computing 90 a best path from the CtxCurPoint to the FinalPoint (i.e., endpoint).

Figure 8:
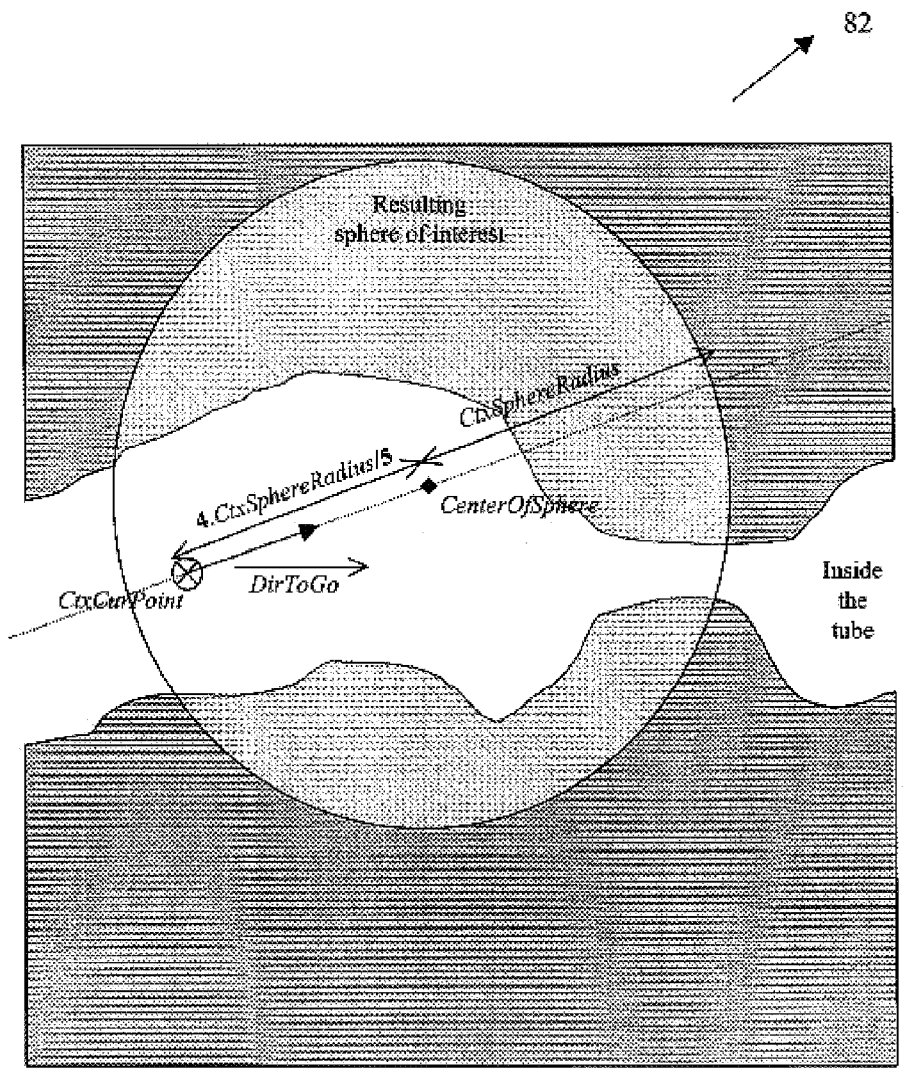
FIG. 8 is a portion of the method illustrated in FIG. 3 for analyzing a tubular structure.

FIG. 8 is a pictorial view of a portion of method 60 including setting 82 a sphere of interest. Setting 82 a sphere of interest includes selecting a sub-volume containing the CtxCurPoint and a plurality of points in the CtxMoveDir, wherein a directional vector in the CtxMoveDir is defined for the CtxCurPoint.

In use, and referring to FIGS. 7 and 8, the operator selects a sub-volume which includes the CtxCurPoint, i.e., a three-dimensional point, and the DirToGo, i.e., a three-dimensional vector. In one embodiment, a radius of the sphere (CtxSphereRadius) is fixed. If the DirToGo vector is normalized then CenterofSphere is determined according to:

$$CenterOfSphere = CtxCurPoint + 4 \times \left(\frac{CtxSphereRadius}{5}\right) \times DirToGo$$

Referring again to FIG. 7, the volume is then re-initialized in accordance with FIG. 5 described previously herein and computer 36 instructs the program to compute 84 a distance to CtxCurPoint as described herein.

Figure 9:
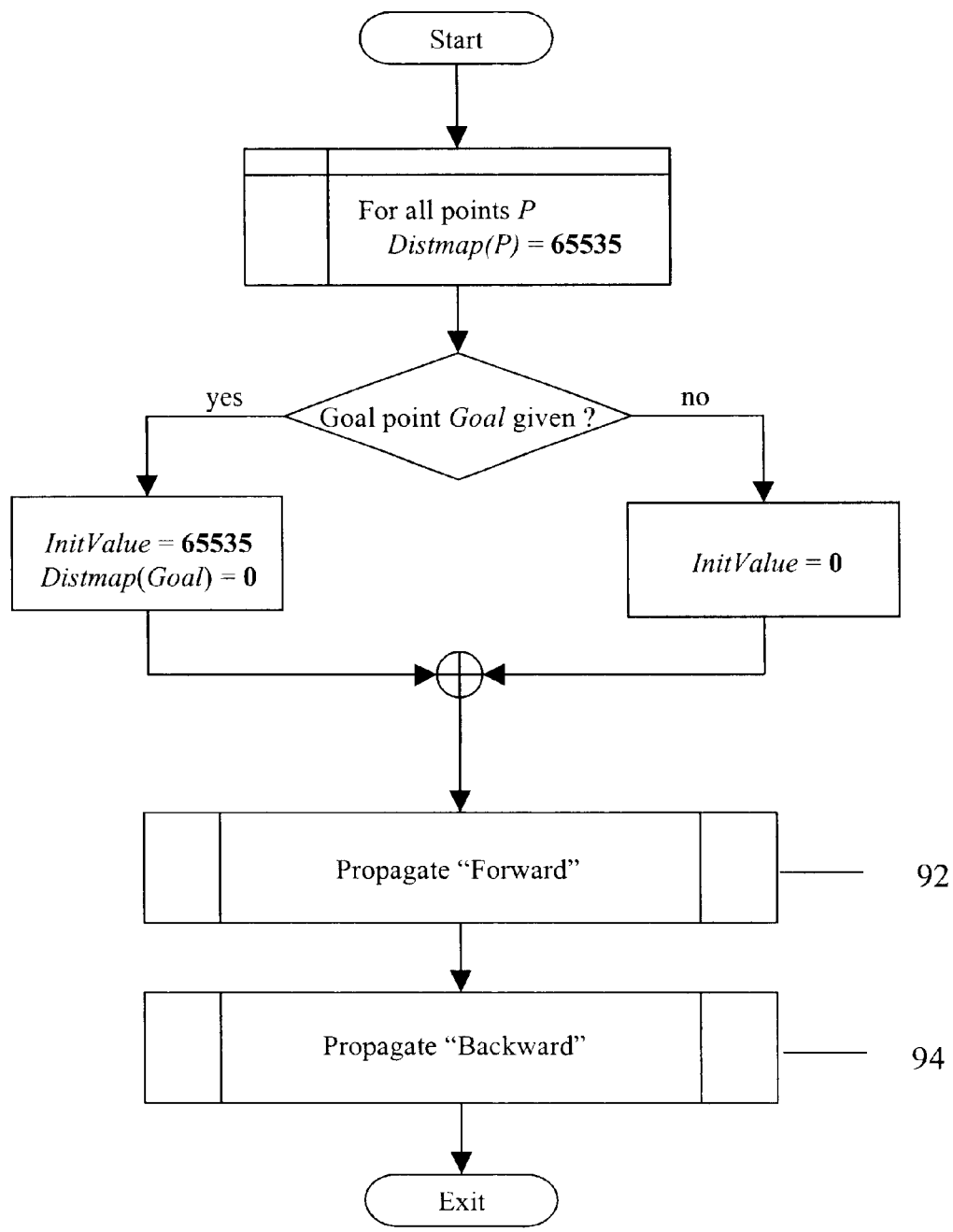
FIG. 9 is a portion of the method illustrated in FIG. 3 for analyzing a tubular structure.

FIG. 9 is a flowchart of a portion of method 60 including computing 84 a distance to a CtxCurPoint. In use, computing 84 a distance to a current point on the trajectory (CtxCurPoint) includes, for all points (P), generating a distance map (DistMap(P))=65535. If a goal point is given then the initial value (Initvalue)=65535. If the goal point is not given, then Initvalue=0. Then computer 36 then initiates at least one of a propagate forward and a propagate backward program.

Figure 10:
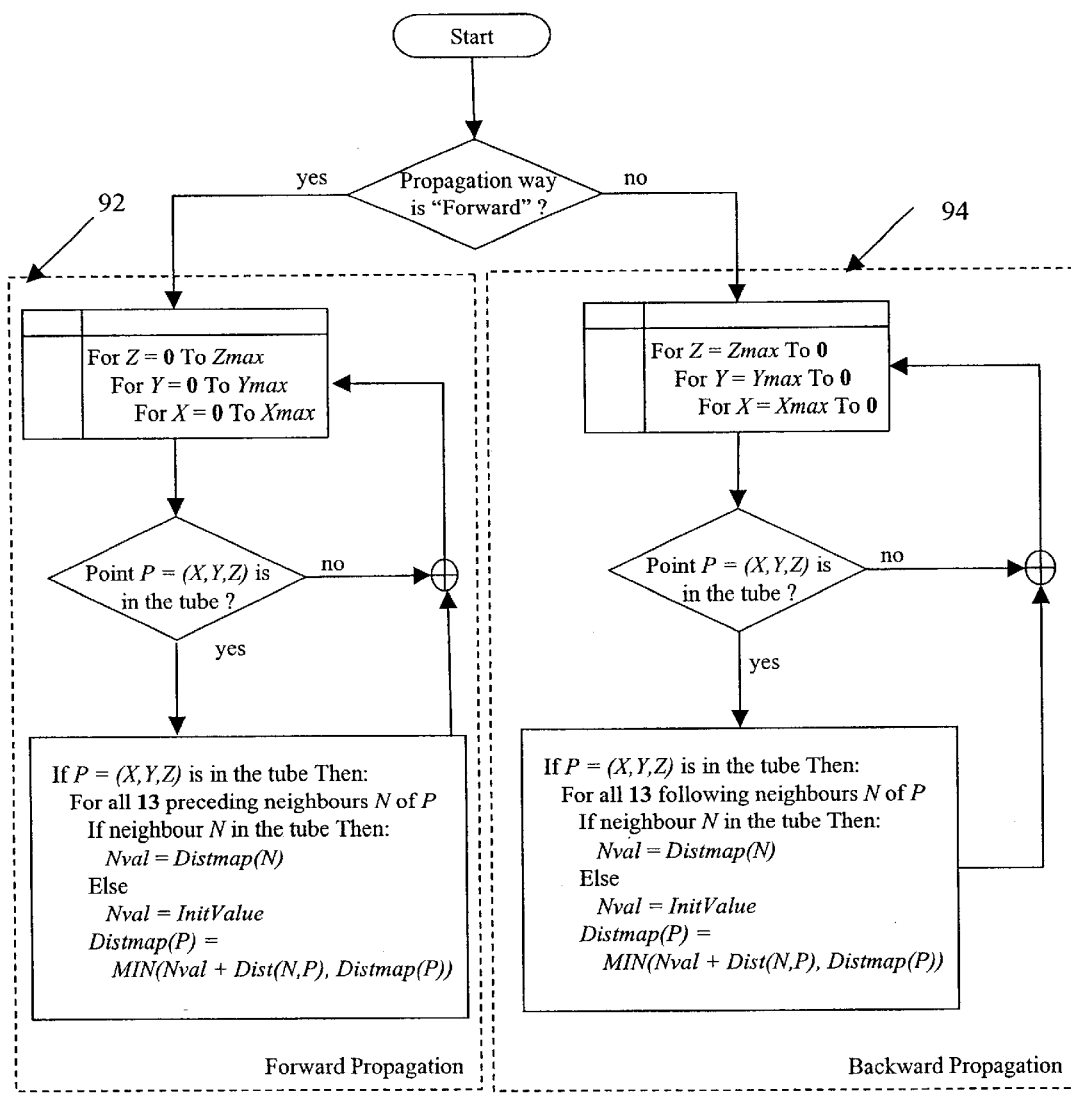
FIG. 10 is a portion of the method illustrated in FIG. 3 for analyzing a tubular structure.

FIG. 10 is a flowchart of a portion of method 60 including propagating 92 forward and propagating 94 backward. If a propagation way is forward or the propagation way is backward, computer 36 performs the method as illustrated in FIG. 10. Computer 36 then computes a distance to the border of the tubular structure.

Figure 11:
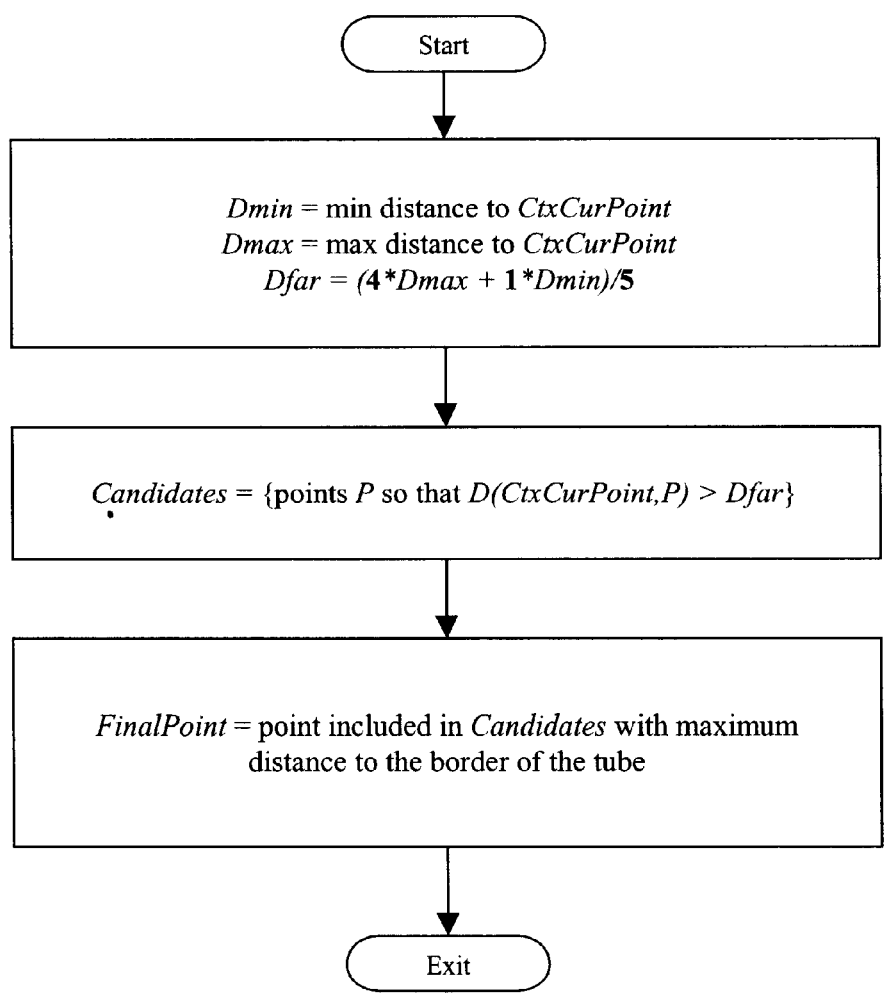
FIG. 11 is a portion of the method illustrated in FIG. 3 for analyzing a tubular structure.

FIG. 11 is a flowchart of a portion of method 60 including computing 86 a distance to a border of a tubular structure. In one embodiment, computer 36 uses the same method, i.e. as illustrated in FIG. 11 to compute the distance to a border of a tubular structure as is used to compute the distance to the CtxCurPoint. Computer 36 then proceeds to getting 88 the furthest point.

Referring again to FIG. 7, computing 80 new points using a global approach also includes getting 88 the furthest point (FinalPoint). FIG. 11 is a flowchart of a portion of method 60 getting 88 the furthest point in accordance with:

Dmin=min distance to CtxCurPoint

Dmax=max distance to CtxCurPoint $$Dfar = \frac{(4 \times D\ max) + (1 \times D\ min)}{5}$$

where the distances to CtxCurPoint (D 0) and distances to the border of the tubular structure are determined using the distance maps describe previously herein.

Getting a furthest centered point (FinalPoint) also includes setting Candidates= points P such that D(CtxCurPoint,P)>Dfar. The FinalPoint is then computed according to: FinalPoint=point included in Candidates with the maximum distance to the border of the tubular structure.

Figure 12:
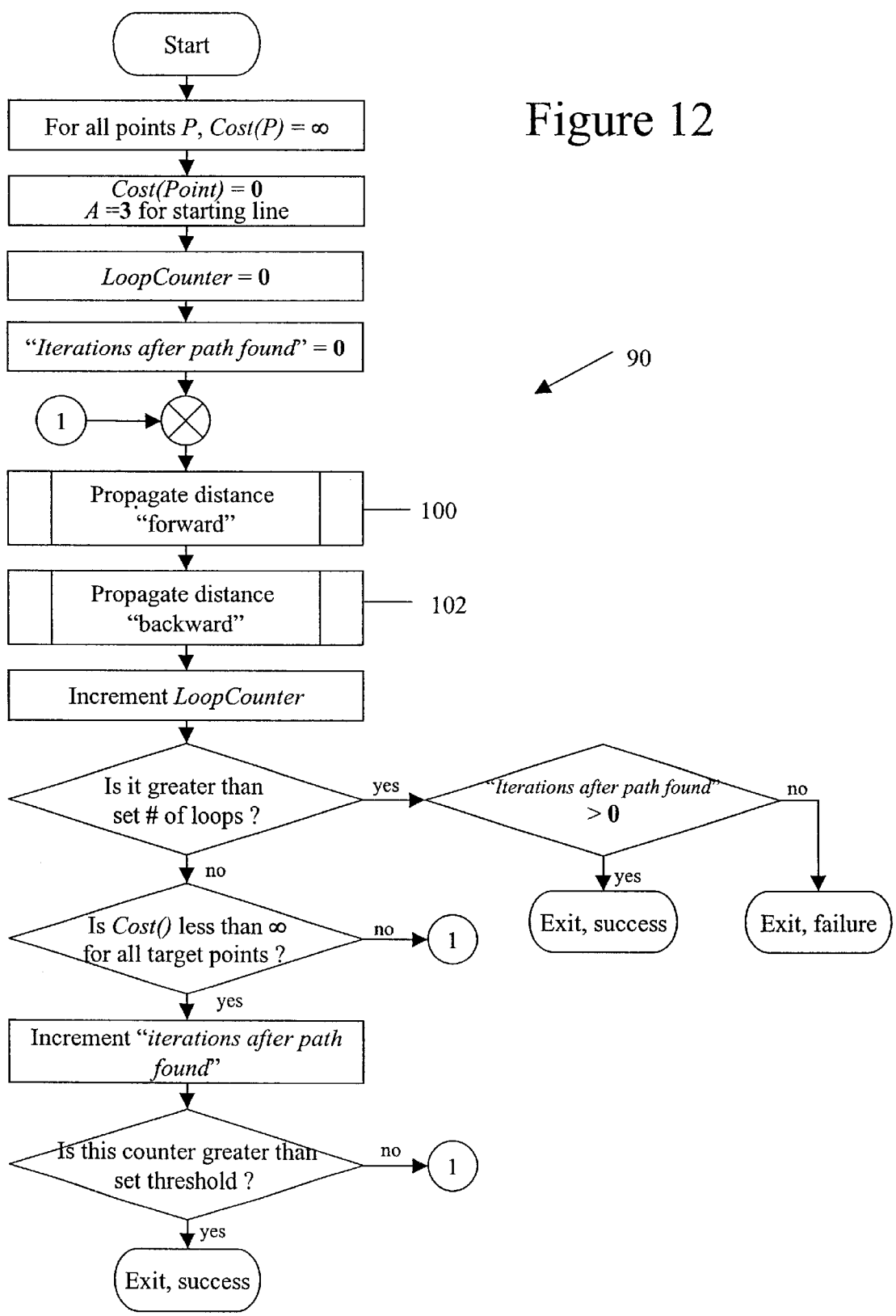
FIG. 12 is a portion of the method illustrated in FIG. 3 for analyzing a tubular structure.
Figure 13:
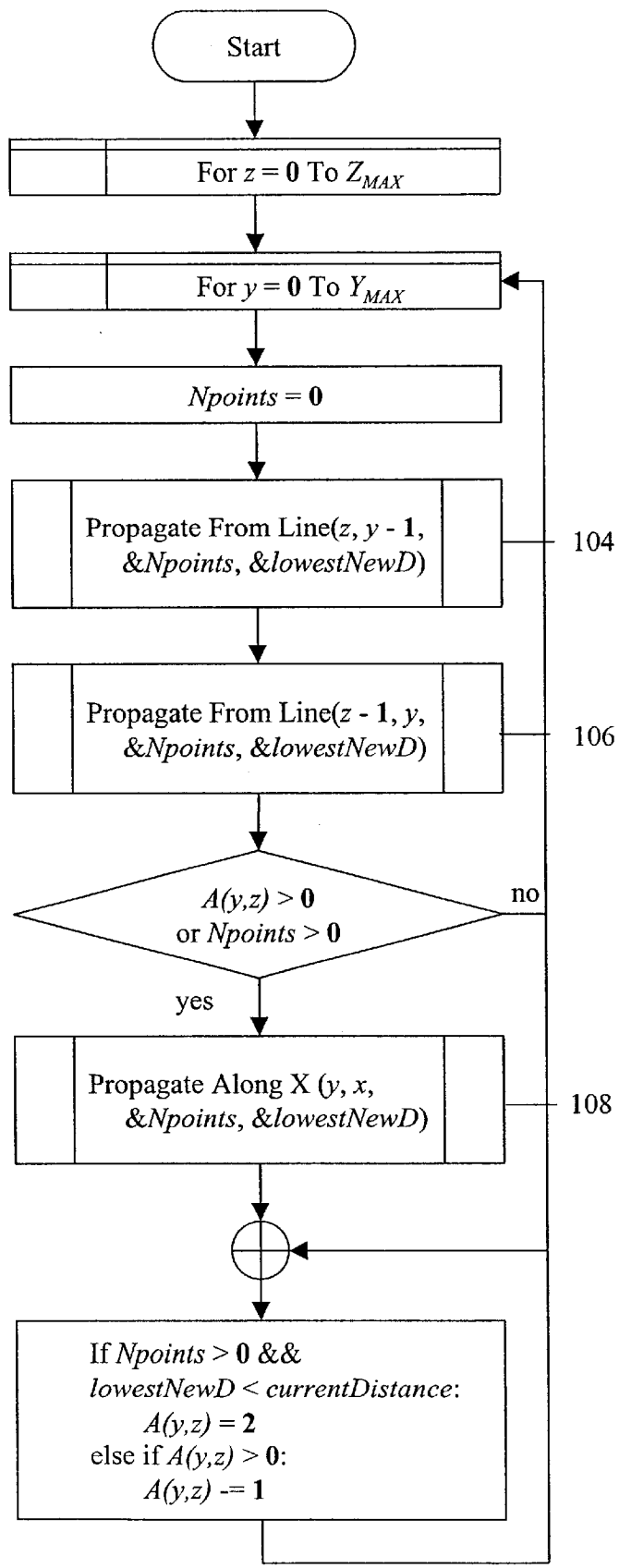
FIG. 13 is a portion of the method illustrated in FIG. 3 for analyzing a tubular structure.
Figure 14:
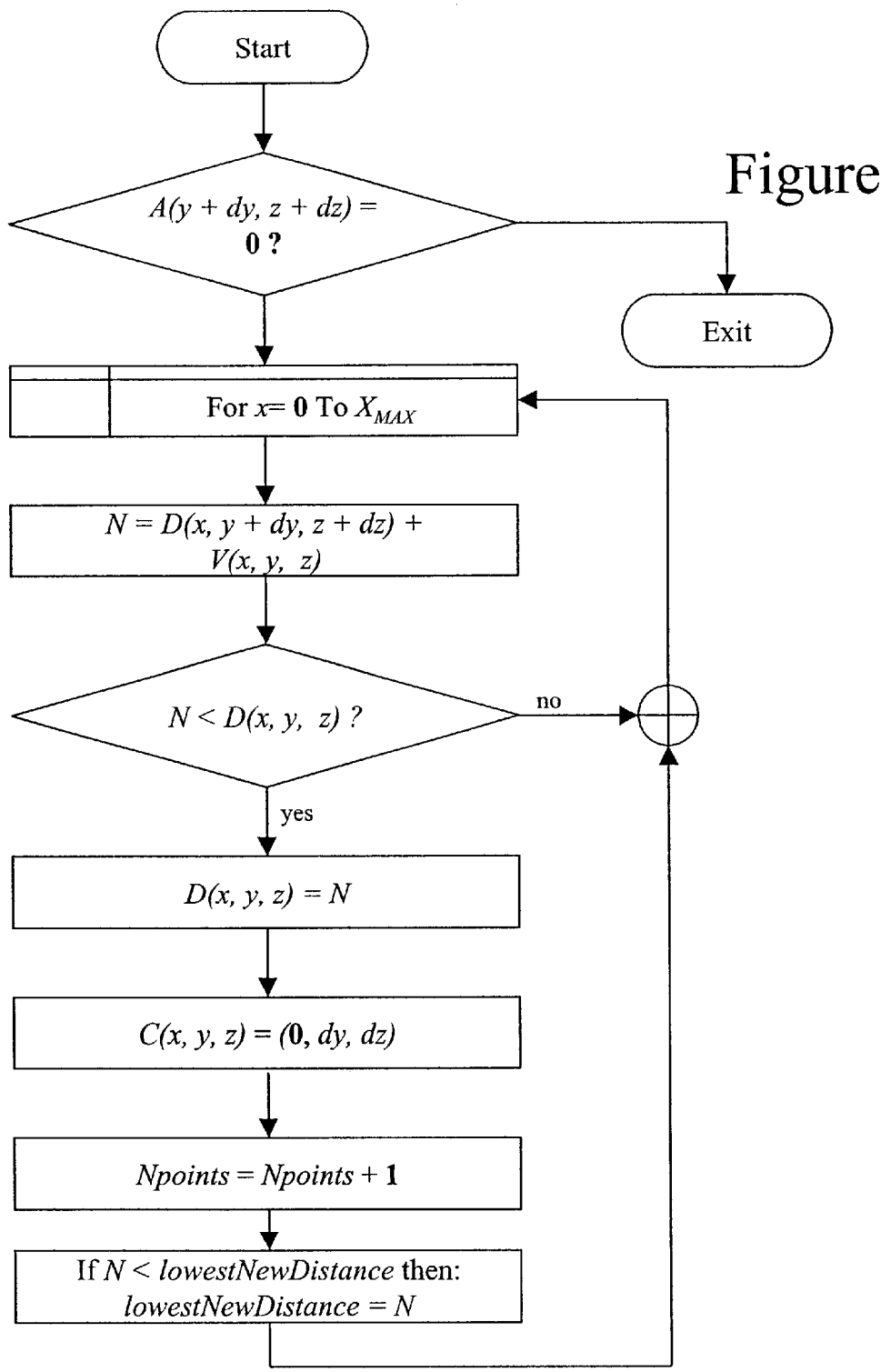
FIG. 14 is a portion of the method illustrated in FIG. 3 for analyzing a tubular structure.
Figure 15:
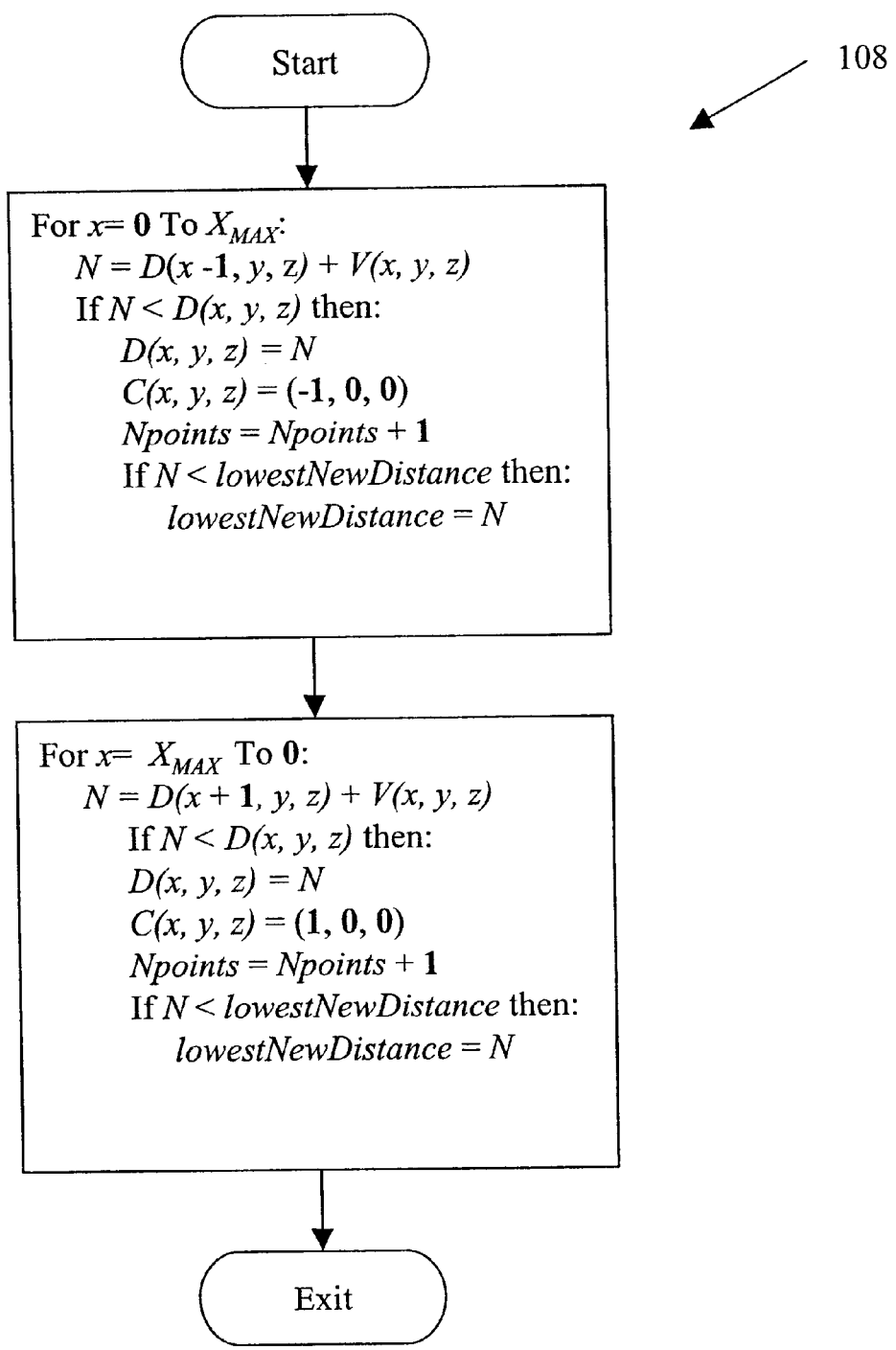
FIG. 15 is a portion of the method illustrated in FIG. 3 for analyzing a tubular structure.

FIG. 12 is a flowchart of a portion of method 60 including computing 90 (shown in FIG. 7) a best path from the CtxCurPoint to the FinalPoint which includes propagating 100 a distance forward and propagating 102 a distance backward as illustrated in FIG. 13. Propagating 100 forward and propagating 102 backward includes propagating 104 from a first line and propagating 106 from a second line, i.e. distance propagation between lines, and propagating 108 along an x axis, i.e. distance propagation inside a line. Propagating 104 from a first line and propagating 106 from a second line is illustrated in FIG. 14. Propagating 108 along an x-axis is illustrated in FIG. 15.

As shown in FIGS. 12–15, the cos(t) function is constructed according to:

$$Cost(P_{n+1}) = Minimum(Cost(P_{n+1}), Cost(P_n) + V(P_{n+1}))$$

where n is a step along the construction path, $P_n$ denotes a point at step n, $V(P_n)$ is a distance to the border of the tube from the corresponding point, and paths are along the six faces of a given voxel. For non-isotropic voxels, the six faces of the voxel form a parallelepiped. For isotropic voxels, the six faces of the voxel form a cube.

Using this function, a sequential process is applied to compute the final result. Beginning from point 0, i.e. starting point, at cos(t) 0. All others points have infinite cos(t). The values are then propagated inside lines, to the left or right points, and then forward across lines, to lines at y+1 or z+1 from y,z. The process is then repeated in the other direction to lines at y−1 and z−1 from y,z. The process will stop after a given maximum number of iterations once the target point has been reached by a propagated "wave". A direction code to a best predecessor point is stored along with the value.

To improve performance, an array of active lines is also used. The array contains a 2 bit word for every line, which is decremented from 2 just after new values have been assigned in a given line, and then to 0, after the line has been processed twice, forward and backward, without any change in the values. This array is used to skip lines that have not yet been reached by the propagation process or for which it has converged.

This process may be aborted by the operator using a feedback function. A scaling feature is also provided to prevent overflows (cos(t)s are stored on 13 bit values for very long paths on noisy objects.) Overflows will result in a failure to detect that targets have been reached. This will be reported and may not cause wrong identifications. The best path is computed by unfolding the direction codes from the target point to the initial seed.

Figure 16:
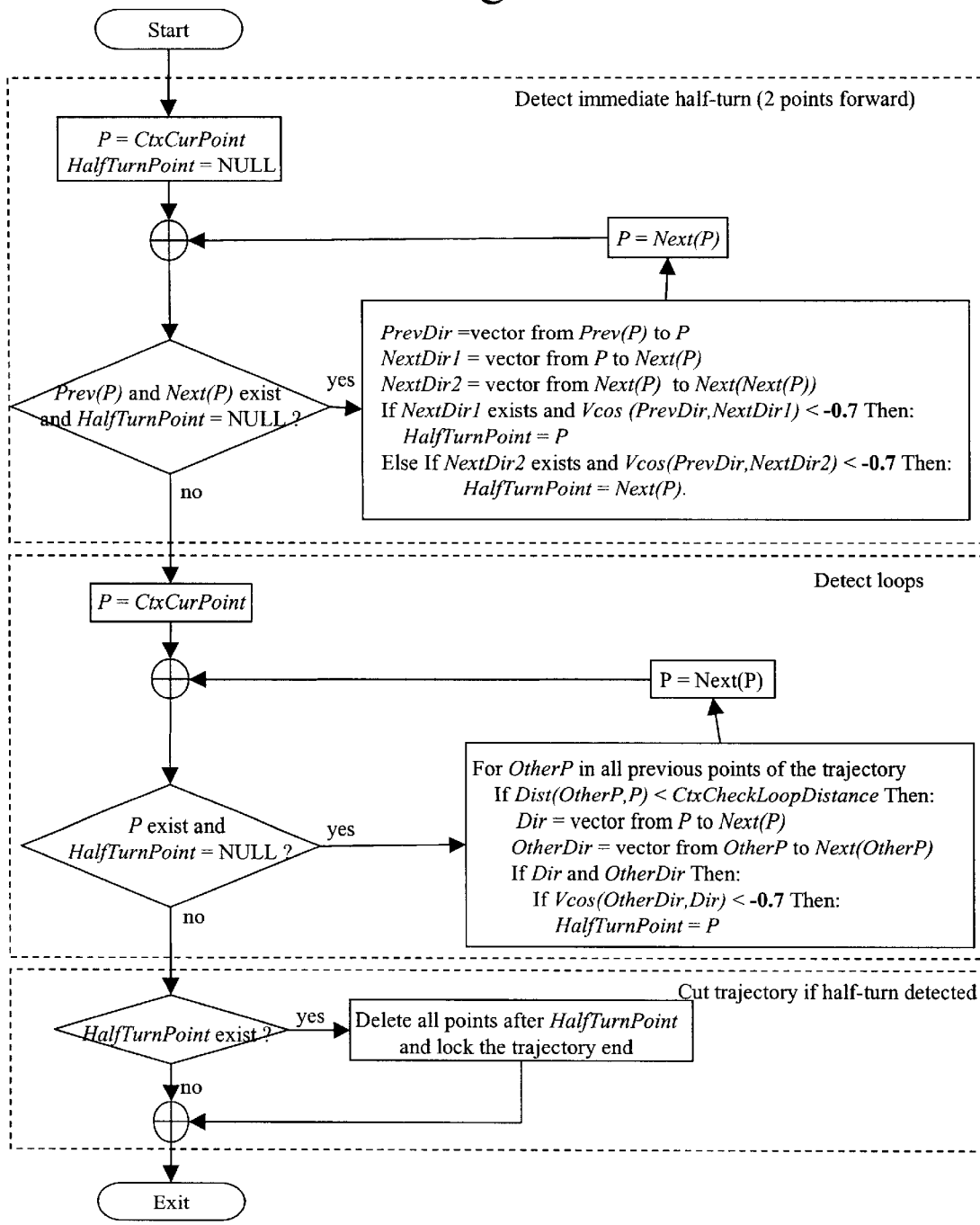
FIG. 16 is a portion of the method illustrated in FIG. 3 for analyzing a tubular structure.

Referring again to FIG. 3, once computer 36 has completed computing 80 new points using a global approach, computer 36 checks for half turns in the tubular structure. FIG. 16 illustrates a portion of method 60 including checking 110 for half turns in the tubular structure. FIG. 17 is an illustrative example of checking 100 for half turns in the tubular structure. Checking 110 for half turns checks the trajectory to ascertain whether the trajectory contains half-turns or loops as illustrated in FIG. 17 and cuts the trajectory if either the half-turn or loop is detected.

After computer 36 has completed checking 110 for half turns computer 36 returns to getting 74 a NextPoint point in the trajectory as described previously herein. If the NextPoint is not null, computer 36 moves toward the NextPoint as described later herein. If the NextPoint is null, computer 36 computes new points using a local approach.

Figure 18:
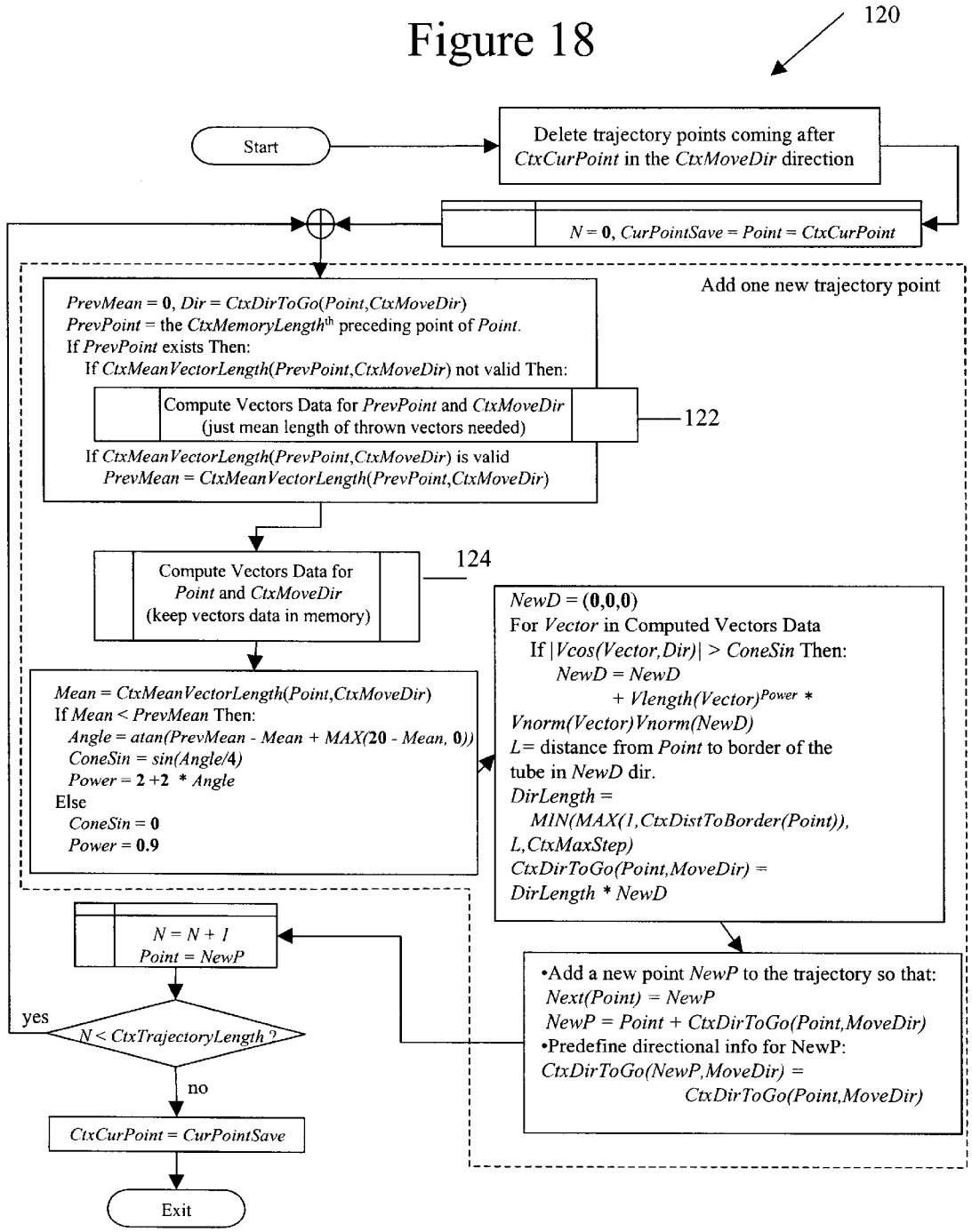
FIG. 18 is a portion of the method illustrated in FIG. 3 for analyzing a tubular structure.

FIG. 18 is a flowchart illustrating computing 120 new points using a local approach. Computing 120 new points using a local approach includes deleting trajectory points subsequent to CtxCurPoint in the CtxMoveDir, computing 122 vector data for PrevPoint and CtxMoveDir, and computing 124 vector data for Point and CtxMoveDir.

FIGS. 19 and 20 are pictorial views illustrating a method of computing 120 new points using a local approach. The local approach is based on assumptions on the topology of the tube such as there is no junction, i.e. there is only one branch, variations of the diameter of the tube are smooth "enough", and turns are smooth. Therefore, using the local approach, at a given point, vectors are thrown (ray casting) in the forward half-plane. The vector's end at the border of the tube and the vector lengths are stored in computer 36. In one embodiment, the resulting directional vector is the sum of thrown vectors ponderated by their length such that the further a border is in a direction, the more that direction contributes in the resulting vector, which is the normal case. If a reduction in the average length of the thrown vectors is detected, then there is a diameter reduction straight forward. More weight is then given to long vectors and shrink the "angle of vision" to avoid half-turns and the resulting vector is the sum of a selection of thrown vectors (those included in the angle of vision) ponderated by a power of their length (so that the faster the reduction is, the higher is the.power). It is a way to force the resulting vector to tend to the longest thrown vector in the tube.

Referring again to FIG. 3, after computing 120 new points using a local approach, computer 36 initiates checking 110 for half turns as described previously herein. Computer 36 then initiates getting 74 next point as described previously herein. Computer 36 then checks to see if NextPoint=null. If NextPoint is equal to null, then computer 36 ends the program. If the NextPoint is not equal to null, computer 36 initiates moving 66 towards NextPoint.

Figure 21:
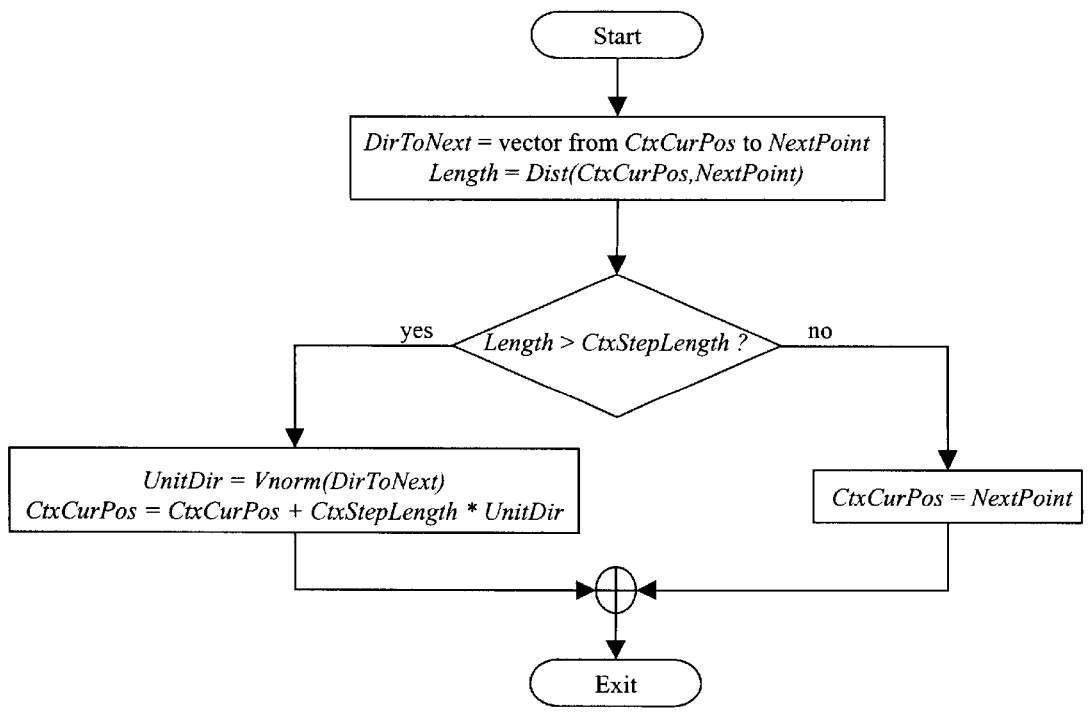
FIG. 21 is a portion of the method illustrated in FIG. 3 for analyzing a tubular structure.

FIG. 21 is a portion of method 60 including moving 66 towards the next point (NextPoint). Given the current and next points in the trajectory context, and given the current cursor position, computer 36 computes a new cursor position in accordance with FIG. 21.

Figure 22:
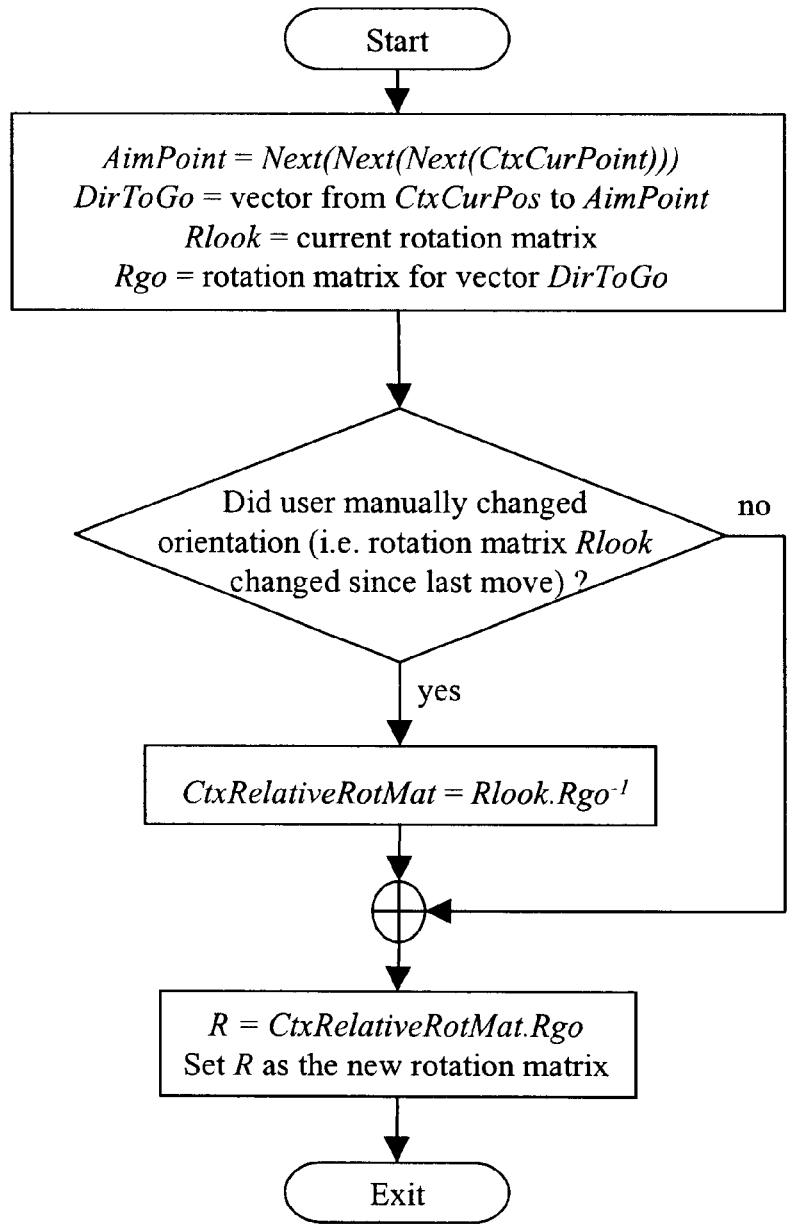
FIG. 22 is a portion of the method illustrated in FIG. 3 for analyzing a tubular structure.

FIG. 22 is a portion of method 60 which includes computing 130 a direction to look. Once the trajectory context and the current cursor position have been determined, computing 130 a direction to look proceeds in accordance with FIG. 22. In use, if the operator moves the cursor, a new trajectory is begun and the relative rotation matrix is reinitialized. Further, each time the operator changes the orientation of an endoscopic view, the relative rotation matrix is computed, such that the view retains the same angle relative to the tracked trajectory In one embodiment, method 60 facilitates guiding an operator along the tubular structure during an examination. Further, since method 60 relies on local computations, it facilitates a reduction in setup time. Method 60 also avoids the definition of start and endpoints and thus reduces the time required by an operator to perform an examination. Additionally, in the case of multiple acquisitions of the same structure, the same starting point is identified accurately for all data sets, then because all cursors travel the same distances along the centerline of the structure, the cursors will identify the same location inside this structure. The only user input required in this case is the definition of the starting point for all examinations.

In another embodiment, a method 200 for reviewing a tubular structure over a passage of time includes providing 202 at least a first three-dimensional data set at a first time and a second three-dimensional data set at a second time representative of the same tubular structure. Method 200 facilitates assisting operators during a patient examination by allowing the operator to compare the results of a previous examination with the results of a current examination, at the same time on computer 36, and to formulate treatment based on the differences in these results. Method 200 also includes generating 204 a first view of the first three-dimensional data set and a second view of the second three-dimensional data set, and positioning 206 a first cursor at a first three-dimensional location in the within the first view and positioning a second cursor at a first three-dimensional location within the second view. Method 200 also includes determining 208 a path inside the first tubular structure and the second tubular structure, defining 210 a direction from the cursor position in at least one of the first view and the second view, and moving 212 the first cursor along the determined path by a pre-determined distance in a pre-determined direction to first cursor second position and moving the second cursor along the determined path by a pre-determined distance in a pre-determined direction to second cursor second position.

Method 200 also includes displaying 220 at least one of a three-dimensional view depicting the first cursor second position, an axial view depicting the first cursor second position, a sagittal view depicting the first cursor second position, a coronal view depicting the first cursor second position, and at least one oblique slice depicting the first cursor second position, and displaying 222 an internal three-dimensional view from at least one of the first cursor second position and the second cursor second position. Method 200 farther includes receiving 224 a directional input and moving at least one of the first cursor and the second cursor the pre-determined distance along the pre-determined path according to the received directional input and displaying 226 at least one internal three-dimensional view of the tubular structure from at least one of the first cursor second position and the second cursor second position directed along the axis of the tubular structure at the respective cursor second position.

Embodiments of the present invention are applicable to selection and analysis of many types of tubular structures, including vascular structures, coronary vessels, and airways. In addition, although embodiments of the present invention have been described in conjunction with a CT imaging systems 10, it will be understood that the present invention is also applicable to other types of imaging systems and images obtained from such systems, as well. Examples of such other types of imaging systems used in other embodiments of the present invention include MR imaging systems and 3-D x-ray imaging systems. In addition, some embodiments of the present invention utilize data computers and displays that are not themselves part of any imaging system. In these cases, the computers obtain data from one or more separate imaging systems, such as via tape, disk, or other storage media, or via a network. At least one such embodiment is configured to accept, handle, and process data from more than one type of imaging system.

Although the methods described herein are in the context of a computed tomography system, the methods are not limited to practice with computed tomography systems and can be utilized in many different imaging modalities. For example, the methods can be used in connection with x-ray, magnetic resonance, positron emission tomography, ultrasound, and other imaging modalities.

While the invention has been described in terms of various specific embodiments, those skilled in the art will recognize that the invention can be practiced with modification within the spirit and scope of the claims.

What is claimed is:

1. A method for analyzing a tubular structure in a patient, said method comprising:

receiving a cursor first position within a displayed tubular structure representative of the tubular structure in the patient;

determining a path inside the tubular structure based only on the received cursor first position; and moving a cursor along the path by a pre-determined distance in a pre-determined direction to a cursor second position.

2. A method in accordance with claim 1 further comprising generating at least one image of the tubular structure using a three-dimensional data set.

3. A method in accordance with claim 1 further comprising displaying at least one of a three-dimensional view depicting the cursor second position, an axial view depicting the cursor second position, a sagittal view depicting the cursor second position, a coronal view depicting the cursor second position, and at least one oblique slice depicting the cursor second position.

4. A method in accordance with claim 1 further comprising displaying an internal three-dimensional view from the cursor second position.

5. A method in accordance with claim 1 wherein moving a cursor along the path by a pre-determined distance in a pre-determined direction to the cursor second position further comprises:

receiving a directional input; and moving the cursor the pre-determined distance along the pre-determined path according to the received directional input.

6. A method in accordance with claim 1 further comprising displaying at least one oblique slice comprising the cursor second position and forming an angle perpendicular to the tubular structure at the cursor second position.

7. A method in accordance with claim 1 further comprising displaying at least one internal three-dimensional view of the tubular structure from the cursor second position directed along the axis of the tubular structure at the cursor second position.

8. A method in accordance with claim 1 further comprising displaying at least one internal three-dimensional view of the tubular structure at the cursor second position such that the view forms an angle with the axis of the tubular structure at the cursor second position.

9. A method in accordance with claim 1 further comprising displaying at least one oblique slice of the tubular structure at the cursor second position such that the oblique slice forms an angle perpendicular with the tubular structure at the cursor second position.

10. A method in accordance with claim 1 further comprising determining when to stop progression of the cursor.

11. A method in accordance with claim 8 further comprising displaying at least one internal three-dimensional view of the tubular structure at the cursor second position such that the view forms an angle with the axis of the tubular structure at the cursor second position that is substantially the same as an angle from the cursor first position such that an orientation of the view at the cursor second position.

12. A method for reviewing a tubular structure over a passage of time, said method comprising:

providing at least a first three-dimensional data set at a first time and a second three-dimensional data set at a second time representative of the same tubular structure;

generating a first view of the first three-dimensional data set and a second view of the second three-dimensional data set;

positioning a first cursor at a first three-dimensional location within the first view and positioning a second cursor at a first three-dimensional location within the second view corresponding to the first cursor location in the first view;

determining a path inside the tubular structure;

defining a direction from the cursor position in at least one of the first view and the second view; and moving the first cursor along the determined path by a pre-determined distance in a pre-determined direction to first cursor second position and moving the second cursor along the determined path by a pre-determined distance in a pre-determined direction to second cursor second position.

13. A method in accordance with claim 12 further comprising displaying at least one of a three-dimensional view depicting the first cursor second position, an axial view depicting the first cursor second position, a sagittal view depicting the first cursor second position, a coronal view depicting the first cursor second position, and at least one oblique slice depicting the first cursor second position.

14. A method in accordance with claim 12 further comprising displaying an internal three-dimensional view from at least one of the first cursor second position and the second cursor second position.

15. A method in accordance with claim 12 wherein moving the first cursor along the determined path by a pre-determined distance in a pre-determined direction to first cursor second position and moving the second cursor along the determined path by a pre-determined distance in a pre-determined direction to second cursor second position further comprises:

receiving a directional input; and moving at least one of the first cursor and the second cursor the pre-determined distance along the pre-determined path according to the received directional input.

16. A method in accordance with claim 12 further comprising displaying at least one internal three-dimensional view of the tubular structure from at least one of the first cursor second position and the second cursor second position directed along the axis of the tubular structure at the respective cursor second position.

17. A computer readable medium encoded with a program executable by a computer for analyzing a tubular structure in a patient, said program configured to instruct the computer to:

receive a cursor first position within a displayed tubular structure representative of a tubular structure in a patient;

determine a path inside the tubular structure based only on the received cursor first position, wherein the determined path includes a determined endpoint; and move a cursor along the path by a pre-determined distance in a pre-determined direction to a cursor second position.

18. A computer readable medium in accordance with claim 17 wherein said computer further configured to generate at least one image of the tubular structure using a three-dimensional data set.

19. A computer readable medium in accordance with claim 17 wherein said computer further configured to display at least one of a three-dimensional view depicting the cursor second position, an axial view depicting the cursor second position, a sagittal view depicting the cursor second position, a coronal view depicting the cursor second position, and at least one oblique slice depicting the cursor second position.

20. A computer readable medium in accordance with claim 17 wherein said computer further configured to display an internal three-dimensional view from the cursor second position.

21. A computer readable medium in accordance with claim 17 wherein to move a cursor along the path by a pre-determined distance in a pre-determined direction to a cursor second position said computer further configured to:

receive a directional input; and move the cursor the pre-determined distance along the pre-determined path according to the received directional input.

22. A computer readable medium in accordance with claim 17 wherein said computer further configured to display at least one oblique slice comprising the cursor second position and forming an angle perpendicular to the tubular structure at the cursor second position.

23. A computer readable medium in accordance with claim 17 wherein said computer further configured to display at least one internal three-dimensional view of the tubular structure from the cursor second position directed along the axis of the tubular structure at the cursor second position.

24. A medical imaging system for analyzing a tubular structure in a patient, said medical imaging system comprising:
a detector array;
at least one radiation source; and
a computer coupled to said detector array and radiation source and configured to:
receive a cursor first position within a displayed tubular structure representative of the tubular structure in the patient;
determine a path including an endpoint inside the tubular structure based only on the received cursor first position; and
move a cursor along the path by a pre-determined distance in a pre-determined direction to a cursor second position.

25. A medical imaging system in accordance with claim 24 wherein to analyze a tubular structure in a patient, said computer further configured to generate at least one image of the tubular structure using a three-dimensional data set.

26. A medical imaging system in accordance with claim 24 wherein to analyze a tubular structure in a patient, said computer further configured to display at least one of a three-dimensional view depicting the cursor second position, an axial view depicting the cursor second position, a sagittal view depicting the cursor second position, a coronal view depicting the cursor second position, and at least one oblique slice depicting the cursor second position.

27. A medical imaging system in accordance with claim 24 wherein to analyze a tubular structure in a patient, said computer further configured to display an internal three-dimensional view from the cursor second position.

28. A medical imaging system in accordance with claim 24 as wherein to move a cursor along the path by a pre-determined distance in a pre-determined direction to a second position, said computer further configured to:
receive a directional input; and
move the cursor the pre-determined distance along the pre-determined path according to the received directional input.

29. A medical imaging system in accordance with claim 24 wherein to analyze a tubular structure in a patient, said computer further configured to display at least one oblique slice comprising the cursor second position and forming an angle perpendicular to the tubular structure at the cursor second position.

30. A medical imaging system in accordance with claim 24 wherein to analyze a tubular structure in a patient, said computer further configured to display at least one internal three-dimensional view of the tubular structure from the cursor second position directed along the axis of the tubular structure at the cursor second position.

31. A medical imaging system in accordance with claim 24 wherein said computer further configured to move a cursor along the path by a pre-determined distance in a pre-determined direction to a cursor second position wherein the cursor second position is the determined endpoint.

* * * * *